United States Patent
Yuki et al.

(10) Patent No.: US 8,538,264 B2
(45) Date of Patent: Sep. 17, 2013

(54) DISPERSION COMPENSATING APPARATUS, DISPERSION COMPENSATING METHOD, OPTICAL RECEIVING APPARATUS, AND OPTICAL RECEIVING METHOD

(75) Inventors: Masahiro Yuki, Kawasaki (JP); Tsukasa Takahashi, Kawasaki (JP); Miki Onaka, Kawasaki (JP); Norifumi Shukunami, Kawasaki (JP); Tatsuya Tsuzuki, Kawasaki (JP); Toshihiro Ohtani, Kawasaki (JP); Ryosuke Goto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 452 days.

(21) Appl. No.: 12/788,773

(22) Filed: May 27, 2010

(65) Prior Publication Data
US 2010/0303459 A1 Dec. 2, 2010

(30) Foreign Application Priority Data
May 29, 2009 (JP) ................................. 2009-131183

(51) Int. Cl.
H04B 10/00 (2006.01)
H04B 10/12 (2006.01)
H04J 14/02 (2006.01)
(52) U.S. Cl.
USPC ............. 398/81; 398/147; 398/149; 398/159
(58) Field of Classification Search
USPC ............................... 398/33, 81, 147, 149, 159
See application file for complete search history.

(56) References Cited

U.S. PATENT DOCUMENTS

| | | | |
|---|---|---|---|
| 6,661,974 B1 * | 12/2003 | Ooi et al. | 398/95 |
| 6,674,936 B2 * | 1/2004 | Jacobowitz et al. | 385/24 |
| 6,889,347 B1 * | 5/2005 | Adams et al. | 714/704 |
| 7,536,108 B2 * | 5/2009 | Hirano et al. | 398/147 |
| 7,668,459 B2 * | 2/2010 | Inui et al. | 398/29 |
| 2003/0156846 A1 | 8/2003 | Ford et al. | |
| 2004/0141756 A1 | 7/2004 | Nakamura et al. | |

FOREIGN PATENT DOCUMENTS

| | | |
|---|---|---|
| JP | 10-242943 | 9/1998 |
| JP | 2001-42232 | 2/2001 |
| JP | 2003-228032 | 8/2003 |
| JP | 2004-222060 | 8/2004 |

OTHER PUBLICATIONS

Japanese Office Action for corresponding Japanese Application 2009-131183; mailed Sep. 6, 2011.
Optoelectronic Industry and Technology Development Association, *Group Delay Ripple Measurement Method for Tunable Dispersion Compensators—Technical Paper*, Japan, Oct. 9, 2008 (34 pp.).
Notice of Rejection, mailed Mar. 8, 2011, in corresponding Japanese Application No. 2009-131183 (4 pp.).

\* cited by examiner

*Primary Examiner* — Dalzid Singh
(74) *Attorney, Agent, or Firm* — Staas & Halsey LLP

(57) ABSTRACT

A dispersion compensating apparatus includes a tunable dispersion compensator that dispersion-compensates an optical signal using a group delay property that is asymmetrical in bands outside an effective band; a set device that sets a dispersion compensation amount in the tunable dispersion compensator; and a shifter that shifts a central frequency of the effective band of the tunable dispersion compensator, based on the dispersion compensation amount set by the set device.

16 Claims, 31 Drawing Sheets

| DISPERSION COMPENSATION AMOUNT | SHIFT AMOUNT |
|---|---|
| .... | .... |
| -1000 | +3 |
| -900 | +2 |
| .... | .... |
| -100 | +1 |
| 0 | 0 |
| +100 | -1 |
| .... | .... |
| +900 | -2 |
| +1000 | -3 |
| .... | .... |

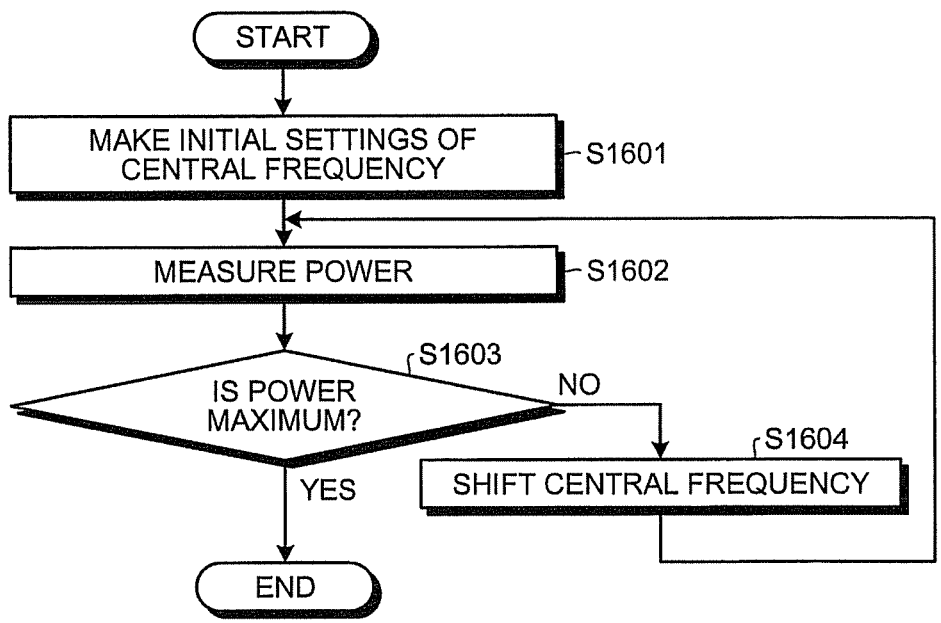
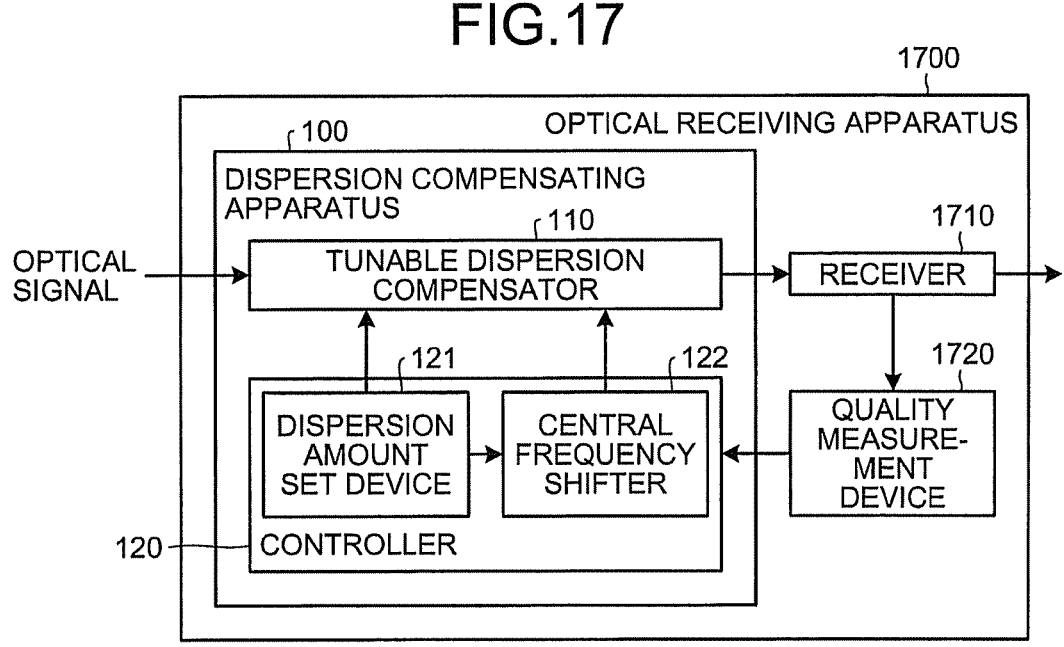

| DISPERSION COMPENSATION AMOUNT | SHIFT AMOUNT | CONTROL AMOUNT |
|---|---|---|
| .... | .... | .... |
| −1000 | +3 | +X3 |
| −900 | +2 | +X2 |
| .... | .... | .... |
| −100 | +1 | +X1 |
| 0 | 0 | 0 |
| +100 | −1 | −X1 |
| .... | .... | .... |
| +900 | −2 | −X2 |
| +1000 | −3 | −X3 |
| .... | .... | .... |

DISPERSION COMPENSATING APPARATUS, DISPERSION COMPENSATING METHOD, OPTICAL RECEIVING APPARATUS, AND OPTICAL RECEIVING METHOD

CROSS REFERENCE TO RELATED APPLICATIONS

This application is based upon and claims the benefit of priority of the prior Japanese Patent Application No. 2009-131183, filed on May 29, 2009, the entire contents of which are incorporated herein by reference.

FIELD

The embodiments discussed herein are related to optical dispersion compensation.

BACKGROUND

With recent increases in the communication traffic, demands concerning optical communication systems are also increasing. Introduction of not only an optical relay node into a basic network but also introduction of an optical communication system is actively pursued recently for local networks and, an optical communication system has also been formed for a subscriber system. Thus, optical communication systems play an important role in world-wide information networks.

To cope with the rapid increase of data communication, construction of a higher-speed and larger-capacity optical communication system that uses wavelength division multiplexing (WDM) and optical time division multiplexing (OTDM) is advancing. Introduction of an optical communication system at 40 [Gb/s] or higher has been started.

When the propagation speed reaches 40 [Gb/s] or higher, the optical pulse width of an optical signal becomes narrow, that is, several pico seconds and therefore, waveform distortion caused by slight wavelength dispersion of an optical fiber significantly degrades the propagation performance of the optical fiber. For example, when the propagation speed is increased from 10 [Gb/s] to 40 [Gb/s], dispersion tolerance becomes only 1/16. The dispersion of a propagation fiber temporally varies with temperature variation and environmental variation, and slight variations affect propagation performance.

One approach involves disposing a tunable dispersion compensator (TDC) for each channel in a receiving apparatus and controlling performance degradation caused by wavelength dispersion by adding dispersion of a sign opposite to that of dispersion accumulated in a transmission path such that the accumulated dispersion is offset.

It is considered that a more stable propagation property of a transmission path may be secured by adjusting the amount of dispersion compensation by a TDC corresponding to temporal variation of wavelength dispersion of the transmission path. For example, TDCs such as those of an etalon type, a virtually imaged phased array (VIPA) type, and a fiber Bragg grating (FBG) type have been developed as TDCs that can vary the amount of dispersion compensation (see, e.g., Optoelectronic Industry and Technology Development Association, "Group Delay Ripple Measurement Method for Tunable Dispersion Compensators—Technical Paper", Oct. 9, 2008).

However, the above conventional approach has a problem in that an optical signal is degraded due to a group delay ripple in a group delay property of a tunable dispersion compensator. More specifically, in a tunable dispersion compensator whose transmission band is sufficiently wider than an effective band of the group delay property, an optical signal input into the tunable dispersion compensator is degraded due to a group delay ripple outside the effective band when a band occupied by the optical signal overlaps a band outside the effective band of the group delay property of the tunable dispersion compensator.

In a tunable dispersion compensator that is conventionally used such as that of the VIPA type, the transmittance in bands outside an effective band is low and therefore, a component of a band affected by a group delay ripple in an optical signal is attenuated. Therefore, the influence of the group delay ripple on the optical signal is slight. Hence, no attention has been paid to the degradation of an optical signal due to a group delay ripple of a tunable dispersion compensator.

In contrast, in a tunable dispersion compensator whose transmission band is sufficiently wide relative to a dispersion band such as an etalon TDC, a component in each band outside an effective band is not substantially attenuated. Therefore, it is known that an optical signal is degraded due to an influence of a group delay ripple in a tunable dispersion compensator such as that of the etalon type whose transmission band is sufficiently wide relative to a dispersion band.

A band occupied by an optical signal is widened when the bit rate of the optical signal is high and therefore, it is difficult to establish an effective band of the group delay property in a tunable dispersion compensator to the extent that the effective band may cover the band occupied by the optical signal. Hence, degradation of an optical signal due to a group delay ripple in the group delay property of a tunable dispersion compensator becomes significant as the bit rate of the optical signal becomes high.

It is generally known that a trade-off relation exists between the amount of wavelength dispersion compensation by a tunable dispersion compensator and an effective band of a group delay property, and it may be considered that the effective band of the group delay property of the tunable dispersion compensator is widened by providing multiple tunable dispersion compensators each having a small wavelength dispersion compensation amount and a wide effective band of the group delay property. In this case, the band occupied by the optical signal input into the tunable dispersion compensator may also be adapted to not overlap any band outside the effective band in the group delay property of the tunable dispersion compensator. However, in this case, problems arise such as increases in insertion loss, the size of the apparatus, and the cost therefor caused by providing the tunable dispersion compensator in plural.

SUMMARY

According to an aspect of an embodiment, a dispersion compensating apparatus includes a tunable dispersion compensator that dispersion-compensates an optical signal using a group delay property that is asymmetrical in bands outside an effective band; a set device that sets a dispersion compensation amount in the tunable dispersion compensator; and a shifter that shifts a central frequency of the effective band of the tunable dispersion compensator, based on the dispersion compensation amount set by the set device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 16 is a flowchart of an example of operations of the dispersion compensating apparatus depicted in FIG. 12.

FIG. 17 is a block diagram of a dispersion compensating apparatus according to a third embodiment.

DESCRIPTION OF EMBODIMENTS

Preferred embodiments of the present invention will be explained with reference to the accompanying drawings.

Figures 1, 2:
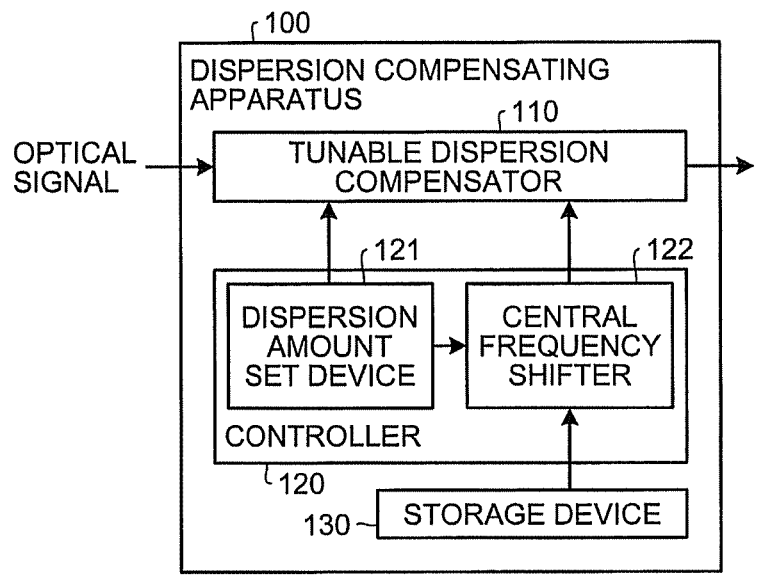
FIG. 1 is a block diagram of a dispersion compensating apparatus according to a first embodiment.
FIG. 2 depicts an example of a table stored in a storage device depicted in FIG. 1.

FIG. 1 is a block diagram of a dispersion compensating apparatus according to a first embodiment. As depicted in FIG. 1, the dispersion compensating apparatus 100 according to the first embodiment includes a tunable dispersion compensator 110, a controller 120, and a storage device 130. The dispersion compensating apparatus 100 is an apparatus that executes dispersion-compensation for an optical signal. The tunable dispersion compensator 110 receives an optical signal and dispersion-compensates the optical signal using a predetermined group delay property.

Figure 3:
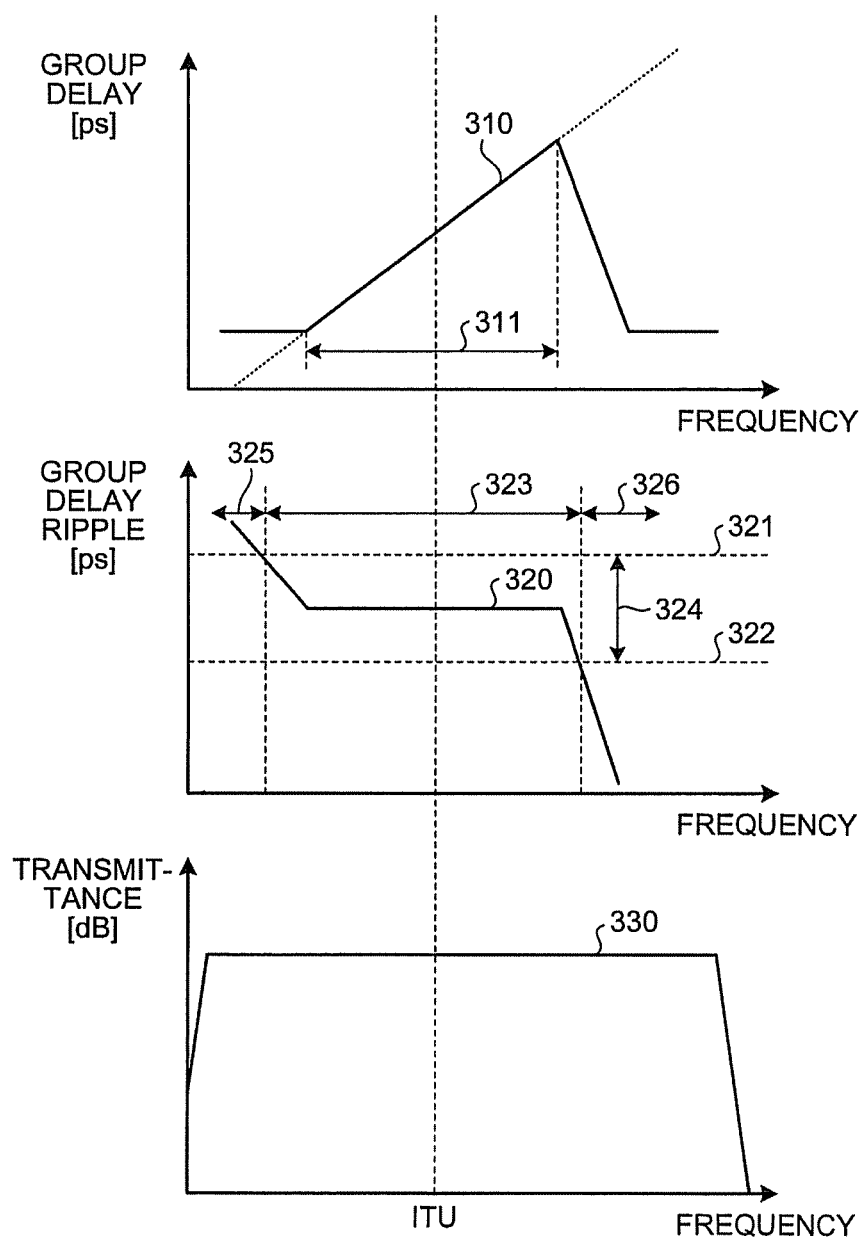
FIG. 3 is a graph of an example of a group delay property and a transmission property of the tunable dispersion compensator depicted in FIG. 1.

The group delay property of the tunable dispersion compensator 110 is a group delay property whose bands outside the effective band are asymmetrical (see FIG. 3). In the transmittance property of the tunable dispersion compensator 110, a transmission band is sufficiently wide relative to the effective band of the dispersion (see FIG. 3). The tunable dispersion compensator 110 is, for example, a tunable dispersion compensator 110 using an etalon (hereinafter, "etalon TDC").

The controller 120 controls operations of the tunable dispersion compensator 110. More specifically, the controller 120 includes a dispersion amount set device 121 and a central frequency shifter 122. The dispersion amount set device 121 is a set device that sets a dispersion compensation amount in the tunable dispersion compensator 110. The dispersion amount set device 121 notifies the central frequency shifter 122 of the dispersion compensation amount set.

The central frequency shifter 122 shifts the central frequency of the effective band in the group delay property of the tunable dispersion compensator 110 (hereinafter, simply "the central frequency of the tunable dispersion compensator 110") based on the dispersion compensation amount reported by the dispersion amount set device 121. Thereby, the group delay property of the tunable dispersion compensator 110 is shifted with regard to frequency.

More specifically, the central frequency shifter 122 refers to a table stored in the storage device 130 when the dispersion compensation amount is reported by the dispersion amount set device 121. In the table stored in the storage device 130, the dispersion compensation amount and a shift amount of the central frequency are correlated with each other. The central frequency shifter 122 obtains the shift amount that is correlated in the table with the dispersion compensation amount reported, and shifts the central frequency of the tunable dispersion compensator 110 according to the shift amount received.

FIG. 2 depicts an example of the table stored in the storage device depicted in FIG. 1. The storage device 130 depicted in FIG. 1 stores therein, for example, a table 200 depicted in FIG. 2. In the table 200, dispersion compensation amounts 210 of the tunable dispersion compensator 110 and shift amounts 220 of the central frequency of the tunable dispersion compensator 110 are correlated with each other.

It is assumed that the dispersion amount set device 121 sets the dispersion compensation amount of the tunable dispersion compensator 110 to be, for example, −100 [ps/nm]. In this case, the central frequency shifter 122 shifts the central frequency of the tunable dispersion compensator 110 by "+1" that is the shift amount 220 correlated in the table 200 with "−100 [ps/nm]" of the dispersion compensation amount 210.

The value of the shift amount 220 that is optimal for the dispersion compensation amount 210 depends on the group delay property of the tunable dispersion compensator 110. To create the table 200, for example, during the manufacture of the dispersion compensating apparatus 100, an optical signal is dispersion-compensated by the tunable dispersion compensator 110 varying the shift amount 220 against a specific dispersion compensation amount 210.

The shift amount 220 obtained when the quality of the optical signal dispersion-compensated by the tunable dispersion compensator 110 becomes highest is stored correlated with the dispersion compensation amount 210. The table 200 may be created by storing the shift amount 220 correlating the shift amount 220 with the dispersion compensation amount 210 in the same manner as above varying the value of the dispersion compensation amount 210.

FIG. 3 is a graph of an example of the group delay property and the transmission property of the tunable dispersion compensator depicted in FIG. 1. In FIG. 3, properties 310, 320, and 330 represent various properties of the tunable dispersion compensator 110 depicted in FIG. 1. The axis of abscissa represents the frequency for each of the properties 310, 320, and 330. "ITU" on the axis of abscissa represents a wavelength grid of an optical signal input into the tunable dispersion compensator 110.

The property 310 represents the group delay property (a property of a group delay against the frequency) of the tunable dispersion compensator 110. For the property 310, the axis of ordinate represents the group delay [ps]. The tunable dispersion compensator 110 depicted in FIG. 1 has a group delay property such as, for example, the property 310. In the tunable dispersion compensator 110, the slope of the property 310 is the dispersion compensation amount.

As indicated by the property 310, the property 310 has a slope of a specific magnitude in a band 311 and therefore, a constant dispersion compensation amount is provided for the optical signal in this band. Outside the band 311, the property 310 is substantially constant and therefore, substantially no dispersion compensation amount is provided for the optical signal.

The property 320 represents a group delay ripple property of the tunable dispersion compensator 110. For the property 320, the axis of ordinate represents the group delay ripple [ps]. The group delay ripple is the difference between a linear approximation of the group delay and the group delay. The property 320 represents the group delay ripple that is linearly approximated by the slope in the band 311 of the property 310.

An upper limit 321 and a lower limit 322 respectively represent an upper limit and a lower limit of the group delay ripple permitted in the communication system. An effective band 323 is a band of the frequency with which the group delay ripple is included within a range 324 between the upper limit 321 and the lower limit 322.

In the initial state, the central frequency of the effective band 323 is set to be the frequency grid (ITU) of the optical signal and a band occupied by the optical signal is included within the range of the effective band 323. Therefore, the effective band 323 is a band that allows execution of sufficient dispersion-compensation of an optical signal input into the tunable dispersion compensator 110. As indicated by the properties 310 and 320, the group delay property is asymmetrical in bands 325 and 326 outside the effective band 323.

The property 330 represents a transmittance property of the tunable dispersion compensator 110. For the property 330, the axis of ordinate represents the transmittance [dB]. As indicated by the property 330, the transmittance property of the tunable dispersion compensator 110 is a property whose transmission band is sufficiently wide relative to the bands including the effective band 323, and the bands 325 and 326.

Figure 4:
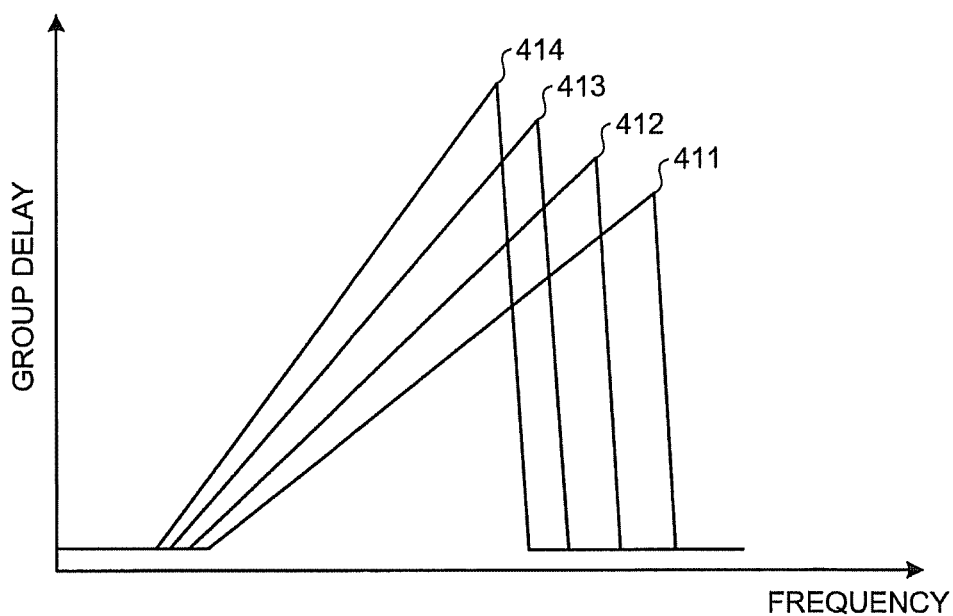
FIG. 4 is a graph of an example of an effective band property of the tunable dispersion compensator depicted in FIG. 1.

FIG. 4 is a graph of an example of an effective band property of the tunable dispersion compensator depicted in FIG. 1. In FIG. 4, the axis of abscissa represents the frequency and the axis of ordinate represents the group delay. When the dispersion compensation amount in the tunable dispersion compensator 110 is varied, the group delay property (the property 310 of FIG. 3) of the tunable dispersion compensator 110 is varied as properties 411 to 414.

The property 411 of the properties 411 to 414 represents a group delay property of the tunable dispersion compensator 110 obtained when the absolute value of the dispersion compensation amount in the tunable dispersion compensator 110 is minimized. The property 414 of the properties 411 to 414 represents a group delay property of the tunable dispersion compensator 110 obtained when the absolute value of the dispersion compensation amount in the tunable dispersion compensator 110 is maximized.

As indicated by the properties 411 to 414, the band whose slope of the group delay property is constant becomes narrower as the absolute value of the dispersion compensation amount in the tunable dispersion compensator 110 is increased. Therefore, the effective band (the effective band 323 of FIG. 3) also becomes narrower.

Figure 5:
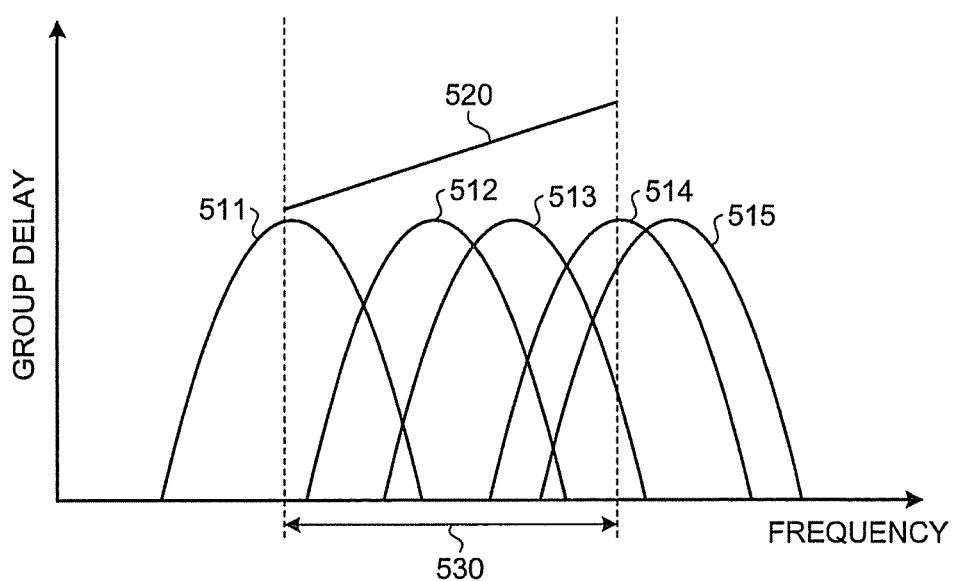
FIGS. 5 and 6 are graphs of an example of the group delay property of the tunable dispersion compensator.
Figure 6:
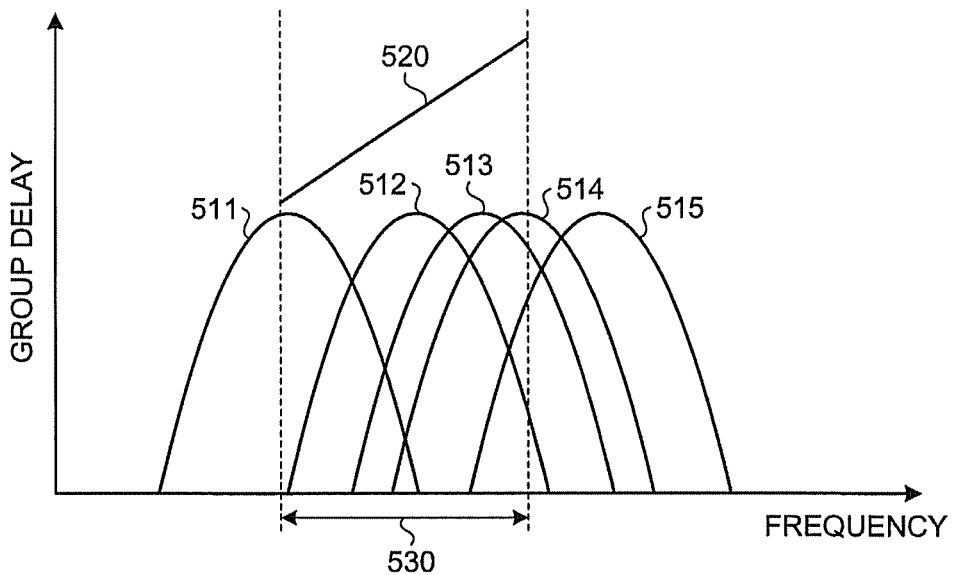

FIGS. 5 and 6 are graphs of an example of the group delay property of the tunable dispersion compensator. In this example, it is assumed that the tunable dispersion compensator 110 is an etalon TDC. The etalon TDC may realize a desired dispersion compensation amount by superposing group delay properties of multiple etalon elements.

In FIGS. 5 and 6, properties 511 to 515 are group delay properties of five etalon elements. A property 520 is a group delay property obtained by superposing the group delay properties of the five etalon elements. An effective band 530 is an effective band of the property 520.

FIG. 5 depicts an example where frequency intervals of the five etalon elements are set to be substantially even. In this example, the slope of the property 520 is relatively small (its dispersion compensation amount is small) and the effective band 530 becomes wide. FIG. 6 depicts an example where the frequency intervals of the five etalon elements are set to become smaller on the high frequency side than on the low frequency side. In this example, the slope of the property 520 is relatively large (its dispersion compensation amount is large) and the effective band 530 becomes narrow.

As depicted in FIGS. 5 and 6, when multiple etalon elements are combined, the etalon elements are disposed at small frequency intervals to increase the dispersion compensation amount. Therefore, the effective band becomes narrow. On the other hand, when the etalon elements are increased to widen the effective band, problems arise such as increased optical insertion loss, complicated control of the etalon elements, and reduced manufacture yield.

Figure 7:
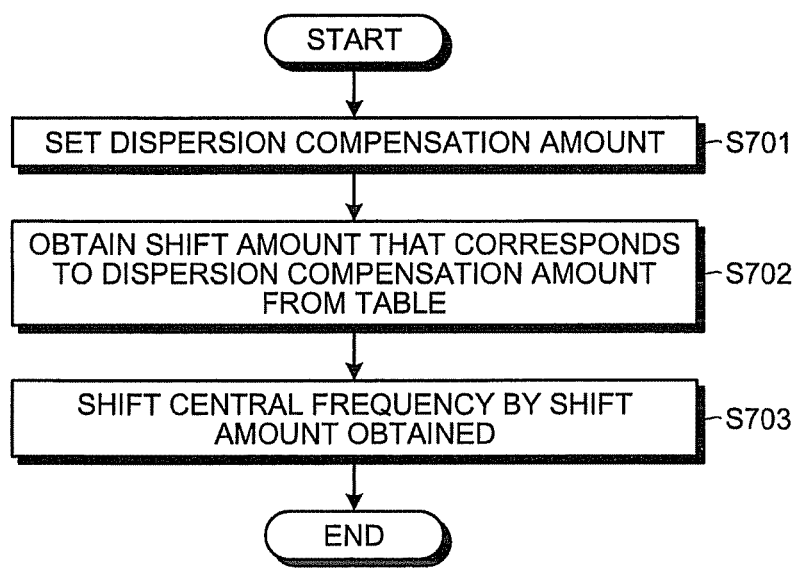
FIG. 7 is a flowchart of exemplary operations of the dispersion compensating apparatus depicted in FIG. 1.

FIG. 7 is a flowchart of exemplary operations of the dispersion compensating apparatus depicted in FIG. 1. The dispersion amount set device 121 first sets the dispersion compensation amount of the tunable dispersion compensator 110 (step S701). The central frequency shifter 122 obtains a shift amount that corresponds to the dispersion compensation amount set at step S701 from the table of the storage device 130 (step S702).

The central frequency shifter 122 shifts the central frequency of the tunable dispersion compensator 110 according to the shift amount obtained at step S702 (step S703) and a series of the operations comes to an end. The above steps are executed each time a dispersion compensation amount of the tunable dispersion compensator 110 is set. Thereby, the central frequency of the tunable dispersion compensator 110 is shifted to an optimal value based on the dispersion compensation amount of the tunable dispersion compensator 110.

Figure 8:
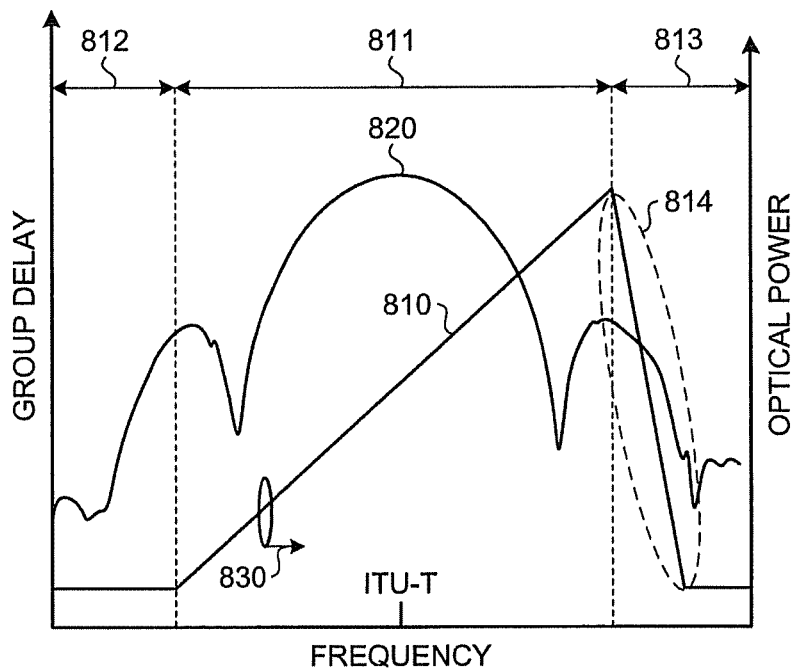
FIG. 8 is a graph of an example of the operations of the dispersion compensating apparatus depicted in FIG. 1.

FIG. 8 is a graph of an example of the operations of the dispersion compensating apparatus depicted in FIG. 1. In FIG. 8, a property 810 is the group delay property of the tunable dispersion compensator 110. A spectrum 820 is a spectrum of the optical signal input into the tunable dispersion compensator 110. For the spectrum 820, the axis of abscissa represents the frequency and the axis of ordinate represents the power (optical power) of the optical signal.

As indicated by the spectrum 820, the optical signal input into the tunable dispersion compensator 110 also includes a signal component in each of bands 812 and 813 outside the effective band 811 in the group delay property of the tunable dispersion compensator 110. On the other hand, the property 810 of the dispersion compensating apparatus 100 is asymmetrical in the bands (the bands 812 and 813) outside the effective band 811.

Therefore, the group delay ripples of the property 810 in the bands 812 and 813 are different from each other. In this example, the group delay ripple in the band 813 is larger than the group delay ripple in the band 812. In this example, the central frequency shifter 122 shifts the central frequency of the effective band 811 in the property 810 toward a higher frequency.

When the central frequency of the effective band 811 is shifted toward the higher frequency, the property 810 is shifted toward a higher frequency side as denoted by a reference numeral "830" and a portion 814 having a large group delay ripple in the property 810 is also shifted toward the higher frequency side. Thereby, the signal component that overlaps the portion 814 of the property 810 in the spectrum 820 is reduced. Thus, degradation of the quality of the optical signal due to the group delay ripples of the property 810 is controlled.

Figure 9:
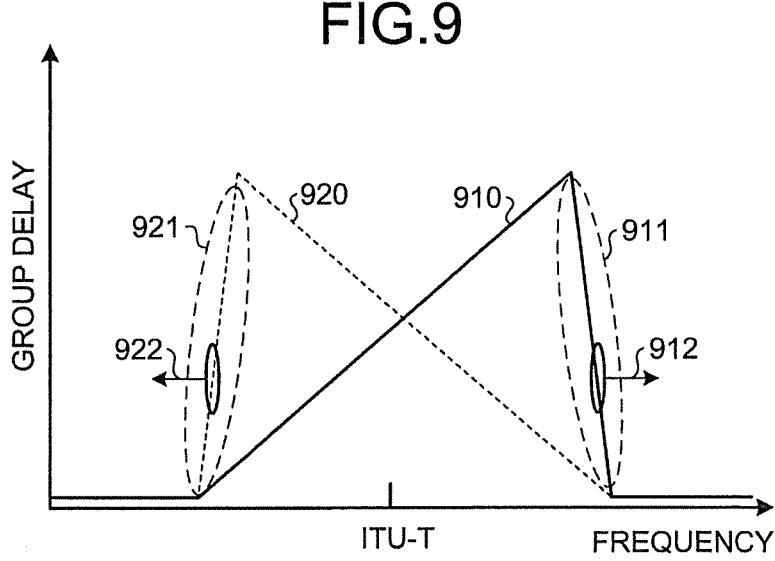
FIG. 9 is a graph of another example of the operations of the dispersion compensating apparatus depicted in FIG. 1.

FIG. 9 is a graph of another example of the operations of the dispersion compensating apparatus depicted in FIG. 1. In FIG. 9, each of properties 910 and 920 represents the group delay property of the tunable dispersion compensator 110. An effective band of the property 910 has negative dispersion and a group delay ripple of a portion 911 higher frequency than the effective band is large. An effective band of the property 920 has positive dispersion and a group delay ripple of a portion 921 lower in frequency than the effective band is large.

When the group delay property of the tunable dispersion compensator 110 is the property 910, the central frequency shifter 122 shifts the central frequency of the effective band in the property 910 toward a higher frequency. Thereby, as denoted by a reference numeral "912", the portion 911 of the property 910 is shifted toward the higher frequency side. Thereby, the signal component that overlaps the portion 911 of the property 910 having a large group delay ripple in the optical signal input into the tunable dispersion compensator 110 is reduced.

When the group delay property of the tunable dispersion compensator 110 is the property 920, the central frequency shifter 122 shifts the central frequency of the effective band in the property 920 toward a lower frequency. Thereby, as denoted by a reference numeral "922", the portion 921 of the property 920 is shifted toward the lower frequency side. Thereby, the signal component that overlaps the portion 921 of the property 920 having a large group delay ripple in the optical signal input into the tunable dispersion compensator 110 is reduced.

Figure 10:
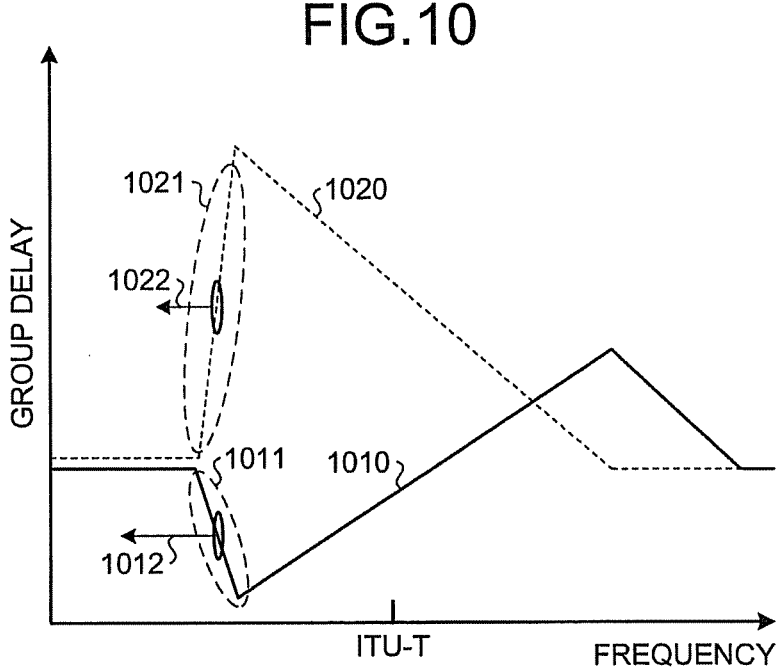
FIG. 10 is a graph of yet another example of the operations of the dispersion compensating apparatus depicted in FIG. 1.

FIG. 10 is a graph of yet another example of the operations of the dispersion compensating apparatus depicted in FIG. 1. In FIG. 10, each of properties 1010 and 1020 represents the group delay property of the tunable dispersion compensator 110. An effective band of the property 1010 has negative dispersion and a group delay ripple of a portion 1011 lower in frequency than the effective band is large. An effective band of the property 1020 has positive dispersion and a group delay ripple of a portion 1021 lower in frequency than the effective band is large.

When the group delay property of the tunable dispersion compensator 110 is the property 1010, the central frequency shifter 122 shifts the central frequency of the effective band in the property 1010 toward a lower frequency. Thereby, as denoted by a reference numeral "1012", the portion 1011 of the property 1010 is shifted toward the lower frequency side. Thereby, the signal component that overlaps the portion 1011 of the property 1010 having a large group delay ripple in the optical signal input into the tunable dispersion compensator 110 is reduced.

When the group delay property of the tunable dispersion compensator 110 is the property 1020, the central frequency shifter 122 shifts the central frequency of the effective band in the property 1020 toward a lower frequency. Thereby, as denoted by a reference numeral "1022", the portion 1021 of the property 1020 is shifted toward the lower frequency side. Thereby, the signal component that overlaps the portion 1021 of the property 1020 having a large group delay ripple in the optical signal input into the tunable dispersion compensator 110 is reduced.

As depicted in FIGS. 8 to 10, the central frequency shifter 122 shifts the central frequency of the tunable dispersion compensator 110 toward a band having a large group delay ripple of the bands outside the effective band of the tunable dispersion compensator 110. Thereby, the large group delay ripple of the group delay property may be shifted from the band occupied by the optical signal.

Figure 11:
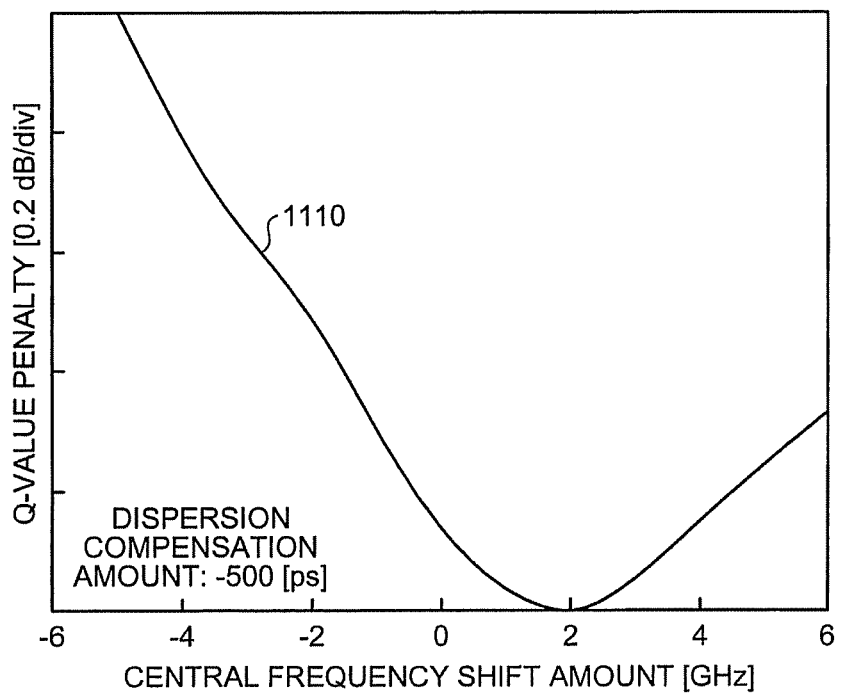
FIG. 11 is a graph of an improvement of signal quality in the dispersion compensating apparatus depicted in FIG. 1.

FIG. 11 is a graph of an improvement of the signal quality in the dispersion compensating apparatus depicted in FIG. 1. In FIG. 11, the axis of abscissa represents the shift amount [GHz] of the central frequency of the tunable dispersion compensator 110. A shift amount "0 [GHz]" on the axis of abscissa represents a state where the central frequency of the tunable dispersion compensator 110 is set at the wavelength grid of the optical signal. The axis of ordinate represents the Q value penalty [0.2 dB/div] of the optical signal that is dispersion-compensated by the dispersion compensating apparatus 100.

A property 1110 represents the Q value penalty against the shift amount of the central frequency. When the property 1110 is measured, an optical signal modulated by return to zero differential quadrature phase shift keying (RZ-DQPSK) at 43 [Gb/s] is input into the tunable dispersion compensator

110. The dispersion compensation amount of the tunable dispersion compensator 110 is set to be −500 [ps].

As indicated by the property 1110, when the dispersion compensation amount of the tunable dispersion compensator 110 is −500 [ps], the Q-value penalty can be minimized by shifting the shift amount [GHz] of the central frequency of the group delay property by +2 [GHz]. As described, in the tunable dispersion compensator 110 that has asymmetrical group delay property in the bands outside the effective band and that has a transmission band sufficiently wide relative to the dispersion band, the quality of an optical signal can be improved by shifting the central frequency.

As described, the dispersion compensating apparatus 100 according to the first embodiment shifts the central frequency of the tunable dispersion compensator 110 based on the dispersion compensation amount of the tunable dispersion compensator 110. Thus, when the group delay property of the tunable dispersion compensator 110 is known in advance, a large group delay ripple of the group delay property can be shifted from the band occupied by the optical signal using the asymmetry of the bands outside the effective band of the group delay property.

Therefore, even when the effective band of the tunable dispersion compensator 110 is narrower than the band occupied by the optical signal, degradation of the optical signal due to the group delay ripple outside the effective band of the group delay property can be controlled. Especially, in the tunable dispersion compensator 110 whose transmission band is sufficiently wide relative to the dispersion band, degradation of the signal quality due to the narrowing of the optical spectrum of the signal can be controlled and, by preventing degradation of the signal due to the group delay ripple, the quality of the optical signal can be improved significantly.

The dispersion compensation amounts and the shift amounts of the central frequency are stored correlated with each other, and the central frequency of the tunable dispersion compensator 110 is shifted based on the shift amount correlated with the dispersion compensation amount set by the set device. Thereby, feed-forward control is established and thus, the central frequency of the tunable dispersion compensator 110 can be shifted at a high speed to an optimal value. Compared to a case where a feedback system is provided, the dispersion compensating apparatus 100 can be implemented with a simpler configuration.

Figure 12:
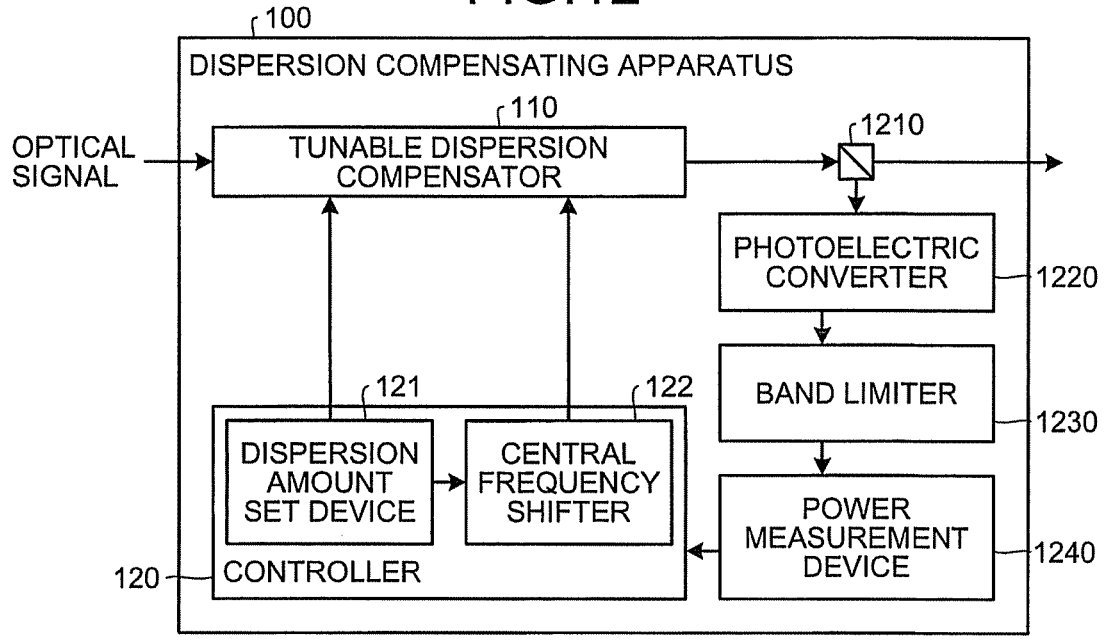
FIG. 12 is a block diagram of a dispersion compensating apparatus according to a second embodiment.

FIG. 12 is a block diagram of a dispersion compensating apparatus according to a second embodiment. In FIG. 12, components identical to those depicted in FIG. 1 are given the same reference numerals used in FIG. 1 and will not again be described. As depicted in FIG. 12, the dispersion compensating apparatus 100 according to the second embodiment includes an optical splitter 1210, a photoelectric converter 1220, a band limiter 1230, and a power measurement device 1240, instead of the storage device 130 depicted in FIG. 1.

The optical splitter 1210 splits an optical signal output from the tunable dispersion compensator 110, outputs the optical signal to an external destination and to the photoelectric converter 1220. The photoelectric converter 1220 photoelectrically converts the optical signal output from the optical splitter 1210 and outputs the resulting electrical signal to the band limiter 1230.

The band limiter 1230 limits the band of the electrical signal output from the photoelectric converter 1220 and outputs the electrical signal whose band is limited, to the power measurement device 1240. The power measurement device 1240 measures the power of the electrical signal output from the band limiter 1230. Thereby, the power of a specific frequency component of the optical signal that is dispersion-compensated by the tunable dispersion compensator 110 after the photoelectric conversion is measured. The power measurement device 1240 notifies the controller 120 of the measured power. For example, the power measurement device 1240 is a radio frequency (RF) power monitor.

The central frequency shifter 122 of the controller 120 shifts the central frequency of the tunable dispersion compensator 110 in a shift direction that corresponds to the power reported by the power measurement device 1240. In the above configuration, for example, the band limiter 1230 is a band pass filter (BPF) that extracts a frequency component that corresponds to the baud rate of the optical signal (see FIG. 13).

Figure 14:
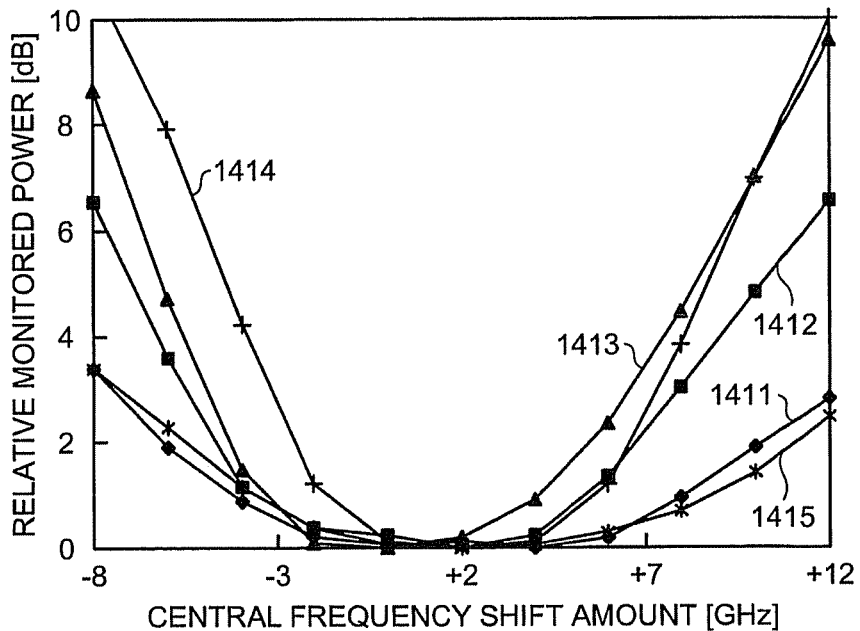
Figure 15:
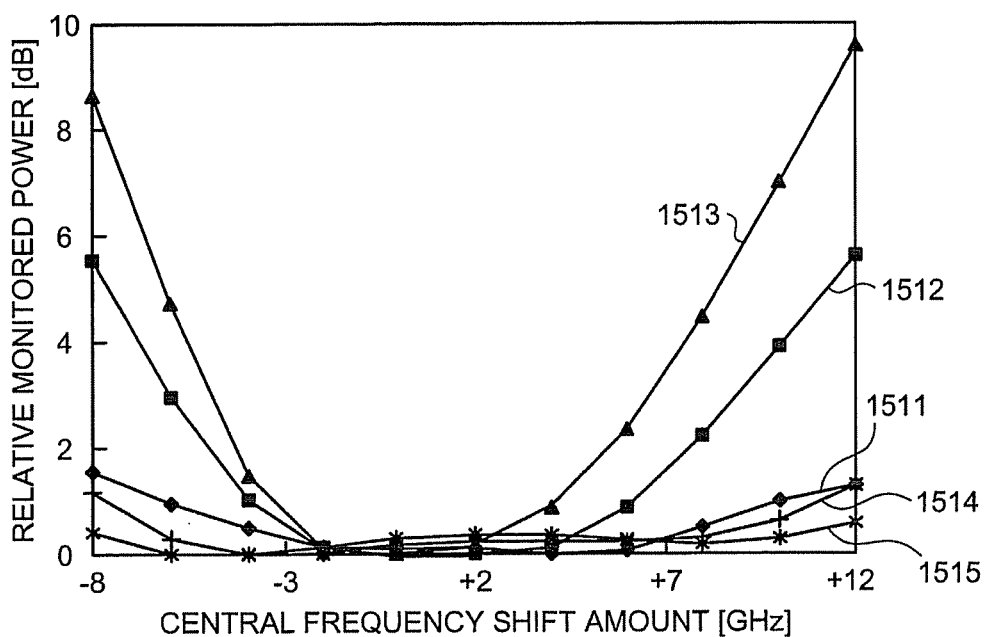

The band limiter 1230 may also be a BPF or a low pass filter (LPF) that extracts a frequency component that is different from the frequency component corresponding to the baud rate of the optical signal (see FIGS. 14 and 15). In this case, preferably, a DC blocker, not depicted, is provided upstream from the power measurement device 1240. The DC blocker removes a DC component of the electrical signal output from the band limiter 1230 to the power measurement device 1240.

Thereby, an AC component of the electrical signal output from the band limiter 1230 is extracted and is output to the power measurement device 1240. The DC blocker is, for example, a capacitor. When band limiting that corresponds to that of the band limiter 1230 is executed in the photoelectric converter 1220 or the power measurement device 1240, a configuration not including the band limiter 1230 provided therein may be employed.

Figure 13:
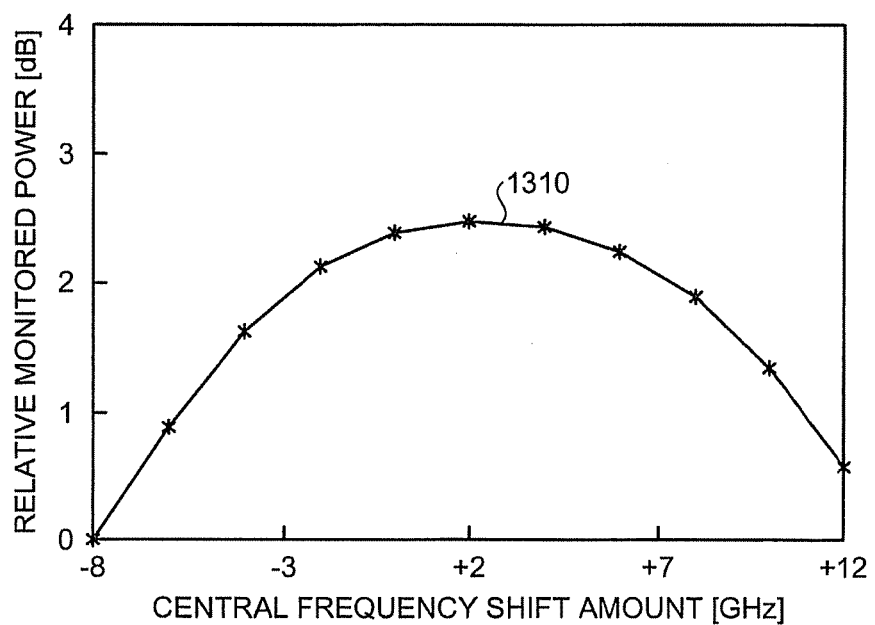
FIGS. 13 to 15 are graphs of a property of power measured by a power measurement device depicted in FIG. 12.

FIG. 13 is a graph of the property of the power measured by the power measurement device depicted in FIG. 12. In FIG. 13, the axis of abscissa represents the shift amount [GHz] of the central frequency of the tunable dispersion compensator 110 and the axis of ordinate represents the power [dB] (relative monitored power) of the electrical signal measured by the power measurement device 1240.

FIG. 13 depicts an example where the band limiter 1230 depicted in FIG. 12 is a BPF and the BPF extracts a frequency component that corresponds to the baud rate of the optical signal (for example, 22.3 [GHz]). In this case, the power measurement device 1240 measures the power of the frequency component that corresponds to the baud rate of the optical signal.

The optical signal input into the tunable dispersion compensator 110 is an optical signal that is modulated by RZ-DQPSK at 44.6 [Gb/s]. As to the tunable dispersion compensator 110, one identical to that of the tunable dispersion compensator 110 whose measurement result is depicted in FIG. 11 is used and therefore, the shift amount of the central frequency of the tunable dispersion compensator 110 minimizing degradation of the optical signal is +2 [GHz].

A property 1310 represents the property of the power of the electrical signal measured by the power measurement device 1240 against the shift amount of the central frequency of the tunable dispersion compensator 110. The property 1310 becomes maximal when the shift amount of the central frequency of the group delay property is +2 [GHz]. Thus, degradation of the optical signal can be minimized by controlling the central frequency of the tunable dispersion compensator 110 to approach the maximum of the property 1310.

In this case, the central frequency shifter 122 shifts the central frequency of the tunable dispersion compensator 110 in a shift direction for the power measured by the power measurement device 1240 to be increased. Thereby, the central frequency of the tunable dispersion compensator 110 is varied to approach the maximum of the property 1310 and thus, degradation of the optical signal is controlled.

FIG. 14 is another graph of the property of power measured by the power measurement device depicted in FIG. 12. In FIG. 14, the axis of abscissa represents the shift amount [GHz] of the central frequency of the tunable dispersion compensator 110 and the axis of ordinate represents the power [dB] (relative monitored power) of the electrical signal measured by the power measurement device 1240.

FIG. 14 depicts an example where the band limiter 1230 depicted in FIG. 12 is a BPF and the BPF extracts a frequency component that differs from the baud rate of the optical signal (for example, 22.3 [GHz]). In this case, the power measurement device 1240 measures the power of the frequency component that differs from the baud rate of the optical signal.

The optical signal input into the tunable dispersion compensator 110 is an optical signal that is modulated by RZ-DQPSK at 44.6 [Gb/s]. As to the tunable dispersion compensator 110, one identical to that of the tunable dispersion compensator 110 whose measurement result is depicted in FIG. 11 is used and therefore, the shift amount of the central frequency of the tunable dispersion compensator 110 minimizing degradation of the optical signal is +2 [GHz].

Each of properties 1411 to 1415 represents a property of the power of the electrical signal measured by the power measurement device 1240 for a shift amount of the central frequency of the tunable dispersion compensator 110. The properties 1411 to 1415 represent properties respectively of a 1-GHz component, a 5-GHz component, a 10-GHz component, a 15-GHz component, and a 20-GHz component of the optical signal.

The properties 1411 to 1415 are minimized when the shift amount of the central frequency of the group delay property is substantially +2 [GHz]. Therefore, degradation of the optical signal can be minimized by controlling the central frequency of the tunable dispersion compensator 110 to approach the minimum of each of the properties 1411 to 1415.

In this case, the central frequency shifter 122 shifts the central frequency of the tunable dispersion compensator 110 in a shift direction for the power measured by the power measurement device 1240 to be decreased. Thereby, the central frequency of the tunable dispersion compensator 110 is varied to approach the minimum values of the properties 1411 to 1415 and thus, degradation of the optical signal is controlled.

FIG. 15 is another graph of the property of the power measured by the power measurement device depicted in FIG. 12. In FIG. 15, the axis of abscissa represents the shift amount [GHz] of the central frequency of the tunable dispersion compensator 110 and the axis of ordinate represents the power [dB] (relative monitored power) of the electrical signal measured by the power measurement device 1240.

FIG. 15 depicts an example where the band limiter 1230 depicted in FIG. 12 is a LPF and the LPF extracts a frequency component that is lower than the baud rate of the optical signal (for example, 22.3 [GHz]). In this case, the power measurement device 1240 measures the power of the frequency component that differs from the baud rate of the optical signal.

The optical signal input into the tunable dispersion compensator 110 is an optical signal that is modulated by RZ-DQPSK at 44.6 [Gb/s]. As to the tunable dispersion compensator 110, one identical to that of the tunable dispersion compensator 110 whose measurement result is depicted in FIG. 11 is used and therefore, the shift amount of the central frequency of the tunable dispersion compensator 110 minimizing degradation of the optical signal is +2 [GHz].

Each of properties 1511 to 1515 represents a property of the power of the electrical signal measured by the power measurement device 1240 for a shift amount of the central frequency of the tunable dispersion compensator 110. The properties 1511 to 1515 represent properties respectively of a 1-GHz component, a 5-GHz component, a 10-GHz component, a 15-GHz component, and a 20-GHz component of the optical signal.

The properties 1511 to 1515 are minimized when the shift amount of the central frequency of the group delay property is substantially +2 [GHz]. Therefore, degradation of the optical signal can be minimized by controlling the central frequency of the tunable dispersion compensator 110 to approach the minimum of each of the properties 1511 to 1515.

In this case, the central frequency shifter 122 shifts the central frequency of the tunable dispersion compensator 110 in a shift direction for the power measured by the power measurement device 1240 to be decreased. Thereby, the central frequency of the tunable dispersion compensator 110 is varied to approach the minimum values of the properties 1511 to 1515 and thus, degradation of the optical signal is controlled.

FIG. 16 is a flowchart of an example of operations of the dispersion compensating apparatus depicted in FIG. 12. Operations of the dispersion compensating apparatus 100 will be described with reference to FIG. 16, for an example where the band limiter 1230 is implemented by a BPF that extracts a frequency component corresponding to the baud rate of an optical signal (see FIG. 13). The central frequency shifter 122 first makes initial settings of the central frequency of the tunable dispersion compensator 110 (step S1601).

The power measurement device 1240 measures the power of the optical signal that is dispersion-compensated by the tunable dispersion compensator 110 (step S1602). The central frequency shifter 122 determines whether the power measured at step S1602 is the maximum of the power of the optical signal (step S1603). If it is determined that the power measured is not the maximum (step S1603: NO), the central frequency shifter 122 shifts the central frequency of the tunable dispersion compensator 110 (step S1604), and the procedure returns to step S1602 and is continued.

If it is determined at step S1603 that the power measured is the maximum (step S1603: YES), a series of operations comes to an end. Alternatively, if it is determined at step S1603 that the power measured is the maximum, the procedure may also return to step S1602 and be continued. Thereby, the power of the optical signal can be controlled to always be the maximum.

At step S1604, the shift direction to shift the central frequency of the tunable dispersion compensator 110 may be determined corresponding to an absolute value and a sign of the dispersion compensation amount set in the tunable dispersion compensator 110 by the dispersion amount set device 121. Thereby, the central frequency of the tunable dispersion compensator 110 is assuredly shifted in the shift direction for the power of the optical signal to become maximal and thus, the power of the optical signal converges at a high speed to the maximum.

An example has been described with reference to FIG. 16 where the band limiter 1230 is implemented by the BPF that extracts the frequency component corresponding to the baud rate of the optical signal (see FIG. 13). In contrast, the band limiter 1230 may be implemented by a BPF that extracts a frequency component different from the baud rate of the optical signal (see FIG. 14) or a BPF that extracts a frequency component that is lower than the baud rate of the optical signal (see FIG. 15). In this case, at step S1603, whether the power measured is the minimum power of the optical signal is determined.

As described, the dispersion compensating apparatus 100 according to the second embodiment shifts the central frequency of the tunable dispersion compensator 110 in the shift direction corresponding to the power of the optical signal that is dispersion-compensated by the tunable dispersion compensator 110. Thereby, when the group delay property of the tunable dispersion compensator 110 is known in advance, the large group delay ripple of the group delay property can be shifted from the band occupied by the optical signal using the asymmetry of the group delay property in the bands outside the effective band.

Therefore, even when the effective band of the tunable dispersion compensator 110 is narrower than the band occupied by the optical signal, degradation of the optical signal due to the group delay ripple outside the effective band of the group delay property can be controlled. Especially, in the tunable dispersion compensator 110 whose transmission band is sufficiently wide relative to the dispersion band, degradation of the signal quality due to narrowing of the optical spectrum of the signal can be controlled and by preventing degradation of the signal due to the group delay ripple, the quality of the optical signal can be improved significantly.

Feedback control that feeds back the power of the optical signal is established and therefore, the central frequency of the tunable dispersion compensator 110 is precisely shifted to an optimal value therefor. Even when the group delay property of the tunable dispersion compensator 110 varies, the central frequency of the tunable dispersion compensator 110 can be set to be the optimal value corresponding to the variation of the group delay property of the tunable dispersion compensator 110.

Even when no optical signal is received, the feedback control may be executed and therefore, control that is independent of a receiver of the optical signal may be executed. Therefore, the central frequency of the tunable dispersion compensator 110 may be shifted at a high speed to the optimal value. By executing the feedback control using the power of the optical signal, highly precise control is enabled without depending on the number of errors of the optical signal. Therefore, the central frequency of the tunable dispersion compensator 110 can precisely be shifted to the optimal value.

FIG. 17 is a block diagram of a dispersion compensating apparatus according to a third embodiment. In FIG. 17, components identical to those depicted in FIG. 1 are given the same reference numerals used in FIG. 1 and will not again be described. As depicted in FIG. 17, an optical receiving apparatus 1700 according to the third embodiment includes the dispersion compensating apparatus 100, a receiver 1710, and a quality measurement device 1720. In the third embodiment, the dispersion compensating apparatus 1700 may be adapted to omit the storage device 130 (see FIG. 1) of the dispersion compensating apparatus 100.

The receiver 1710 receives optical signals output from the tunable dispersion compensator 110. The receiver 1710 outputs one of the optical signals received to an external destination, and outputs the other to the quality measurement device 1720. The quality measurement device 1720 measures the quality of the signal output from the receiver 1710 and notifies the controller 120 of the quality measured.

The quality measurement device 1720 measures, for example, BER, the number of errors, the number of errors corrected or a Q value, etc., that are indices of the signal quality. The central frequency shifter 122 of the controller 120 shifts the central frequency of the tunable dispersion compensator 110 in a shift direction for the quality reported by the quality measurement device 1720, to be improved.

Figure 18:
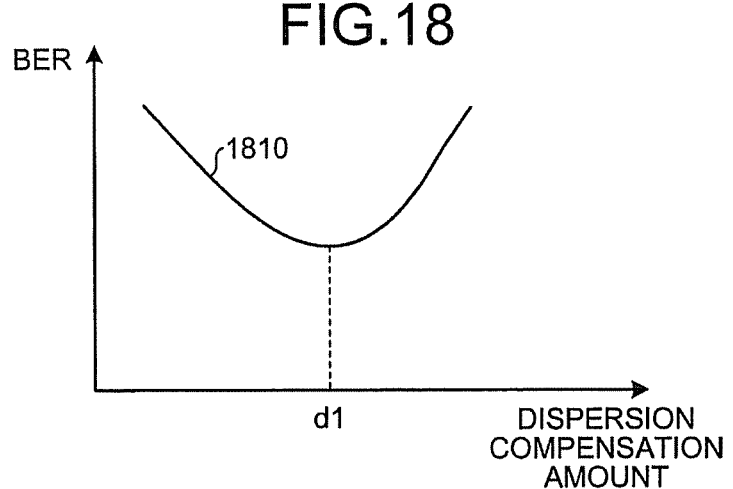
FIGS. 18 and 19 are graphs of a property of BER that is measured by a quality measurement device depicted in FIG. 17.

FIG. 18 is a graph of a property of BER that is measured by the quality measurement device depicted in FIG. 17. In FIG. 18, the axis of abscissa represents the dispersion compensation amount of the tunable dispersion compensator 110 and the axis of ordinate represents the BER of an optical signal measured by the quality measurement device 1720. A property 1810 represents the property of the BER against the dispersion compensation amount.

In the property 1810, the BER becomes minimal at a dispersion compensation amount d1. The dispersion amount set device 121 varies the dispersion compensation amount of the tunable dispersion compensator 110 in a direction for the BER of the optical signal measured by the quality measurement device 1720, to be reduced. Thereby, the dispersion compensation amount of the tunable dispersion compensator 110 is varied such that the dispersion compensation amount approaches the dispersion compensation amount d1.

Figure 19:
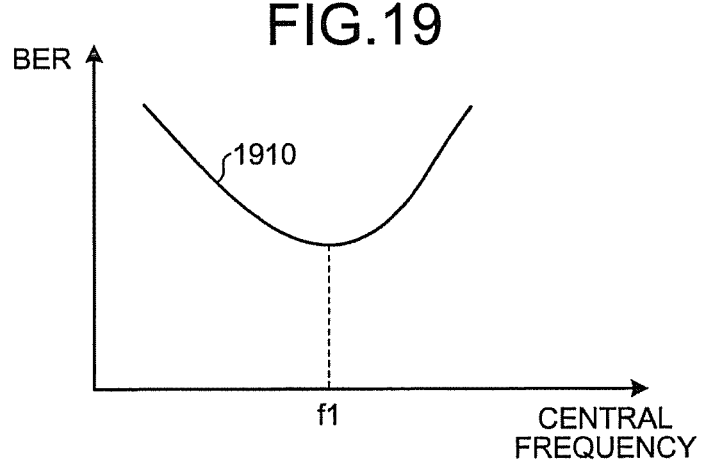

FIG. 19 is another graph of a property of BER that is measured by the quality measurement device depicted in FIG. 17. In FIG. 19, the axis of abscissa represents the central frequency of the tunable dispersion compensator 110 and the axis of ordinate represents the BER of an optical signal measured by the quality measurement device 1720. A property 1910 represents the property of the BER against the dispersion compensation amount.

In the property 1910, the BER becomes minimal at a central frequency f1. The dispersion amount set device 121 varies the dispersion compensation amount of the tunable dispersion compensator 110 in a direction for the BER of the optical signal measured by the quality measurement device 1720, to be reduced. Thereby, the dispersion compensation amount of the tunable dispersion compensator 110 is varied such that the dispersion compensation amount approaches the central frequency f1.

Figure 20:
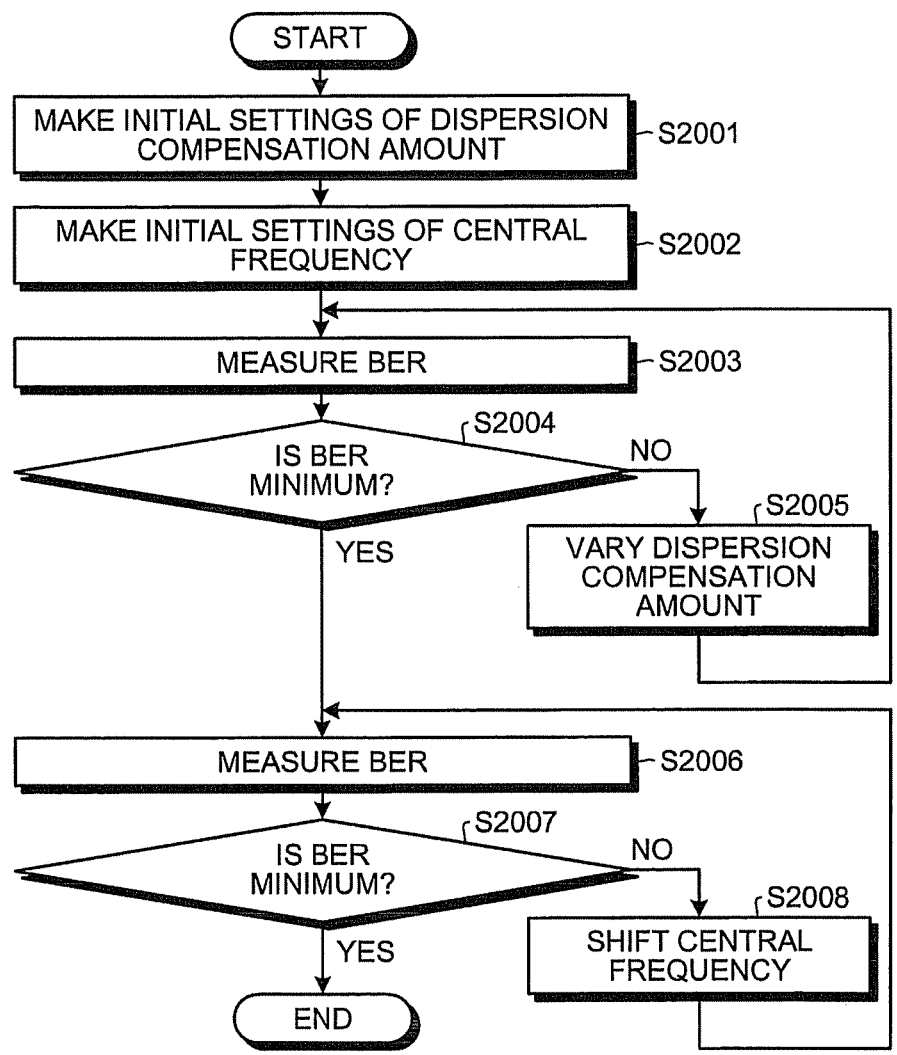
FIGS. 20 and 21 are flowcharts of examples of operations of the optical receiving apparatus depicted in FIG. 17.

FIG. 20 is a flowchart of an example of operations of the optical receiving apparatus depicted in FIG. 17. The dispersion amount set device 121 first makes the initial settings of the dispersion compensation amount of the tunable dispersion compensator 110 (step S2001). The central frequency shifter 122 makes the initial settings of the central frequency of the tunable dispersion compensator 110 (step S2002). The quality measurement device 1720 measures the BER of the optical signal that has been dispersion-compensated by the dispersion compensating apparatus 100 (step S2003).

The dispersion amount set device 121 determines whether the BER measured at step S2003 is the minimum BER (step S2004). If it is determined that the BER is not the minimum BER (step S2004: NO), the dispersion amount set device 121 varies the dispersion compensation amount of the tunable dispersion compensator 110 (step S2005) and the procedure returns to step S2003 and the processing is continued.

If it is determined at step S2004 that the BER is the minimum BER (step S2004: YES), the quality measurement device 1720 measures the BER of the optical signal that has been dispersion-compensated by the dispersion compensating apparatus 100 (step S2006). The central frequency shifter 122 determines whether the BER measured at step S2006 is the minimum BER (step S2007).

If it is determined at step S2007 that the BER is not the minimum BER (step S2007: NO), the central frequency shifter 122 shifts the central frequency of the tunable dispersion compensator 110 (step S2008) and the procedure returns to step S2006 and the processing is continued. If it is determined that the BER is the minimum BER (step S2007: YES), a series of operations comes to an end.

Generally, in the tunable dispersion compensator 110, the dispersion compensation amount more strongly influences the quality of the optical signal compared to the central frequency. For example, in a case where the control of the central frequency is executed before the control of the dispersion compensation amount is executed, the measurement of the quality of the optical signal becomes difficult when the shift of the dispersion compensation amount is large.

Therefore, as at the above operations, preferably, control of the dispersion compensation amount is first executed and control of the central frequency is executed thereafter. However, when the shift of the dispersion compensation amount relative to the wavelength dispersion is small, control of the central frequency may also be executed before control of the dispersion compensation amount is executed.

Figure 21:
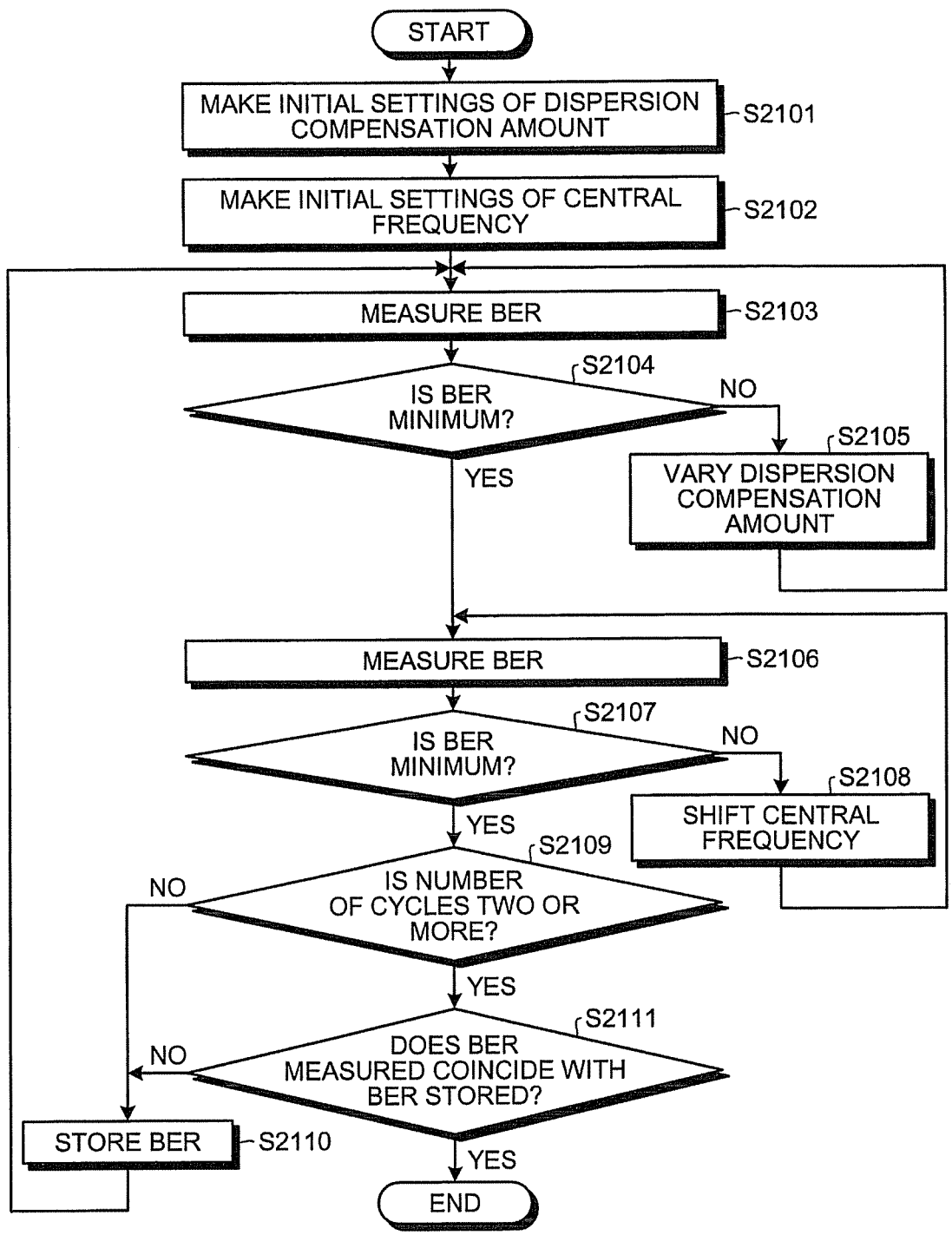

FIG. 21 is a flowchart of another example of the operations of the dispersion compensating apparatus depicted in FIG. 17. Steps S2101 to S2108 depicted in FIG. 21 are identical to steps S2001 to S2008 depicted in FIG. 20 and therefore, will not again be described. If it is determined at step S2107 that the BER is the minimum BER (step S2107: YES), whether the number of cycles of steps S2103 to S2107 is at least two is determined (step S2109).

If it is determined at step S2109 that the number of cycles is not two or more (step S2109: NO), the BER measured at step S2106 is stored in a memory not depicted (step S2110) and the procedure returns to step S2103 and the processing is continued. If it is determined that the number of cycles is two or more (step S2109: YES), whether the BER measured at step S2106 coincides with the BER stored in the memory is determined (step S2111).

If it is determined at step S2111 that the BER measured does not coincide with the BER stored (step S2111: NO), the procedure moves to step S2110 and the processing is continued. If it is determined that the BER measured coincides with the BER stored (step S2111: YES), a series of the operations comes to an end. As described, the same operations as the operations depicted in FIG. 20 are executed several times until the BER does not vary.

Figure 22:
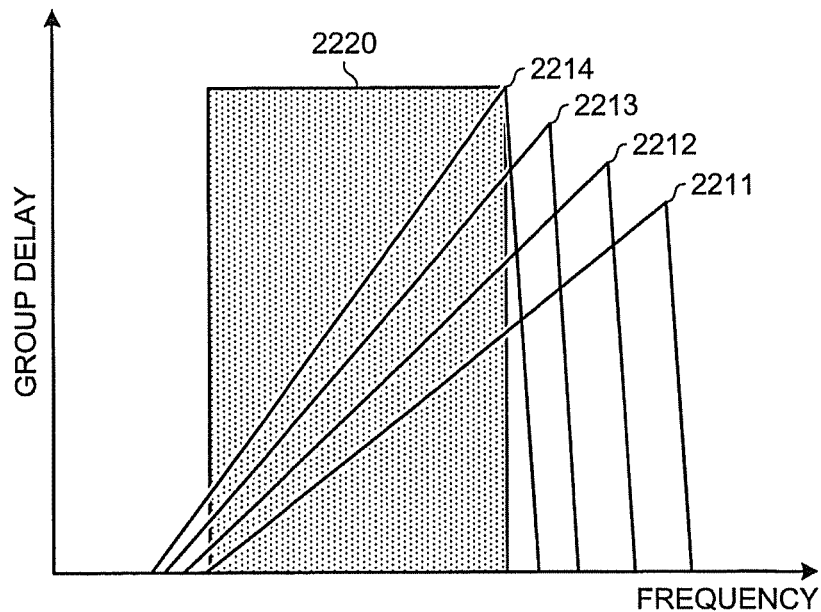
FIG. 22 is a graph of group delay properties obtained when the central frequency is optimal.

FIG. 22 is a graph of group delay properties obtained when the central frequency is optimal. In FIG. 22, the axis of abscissa represents the frequency and the axis of ordinate represents the group delay. FIG. 22 depicts the group delay property obtained when the central frequency of the tunable dispersion compensator 110 is shifted to the optimal value. The value that is optimal as the central frequency is, for example, +2 [GHz] in the example depicted in FIG. 11.

Properties 2211 to 2214 represent group delay properties of the tunable dispersion compensator 110 obtained when the absolute value of the dispersion compensation amount of the tunable dispersion compensator 110 is varied. The property 2211 of the properties 2211 to 2214 represents the group delay property obtained when the absolute value of the dispersion compensation amount of the tunable dispersion compensator 110 is minimized. The property 2214 represents the group delay property obtained when the absolute value of the dispersion compensation amount of the tunable dispersion compensator 110 is maximized.

A band 2220 represents the band occupied by the optical signal input into the tunable dispersion compensator 110. As depicted in FIG. 22, when the central frequency of the tunable dispersion compensator 110 is shifted to the optimal value, the band 2220 is included in the effective band of each of the properties 2211 to 2214. Thereby, even when the dispersion compensation amount of the tunable dispersion compensator 110 is varied within the range of the properties 2211 to 2214, any group delay ripple of the properties 2211 to 2214 is not included in the band 2220.

Figure 23:
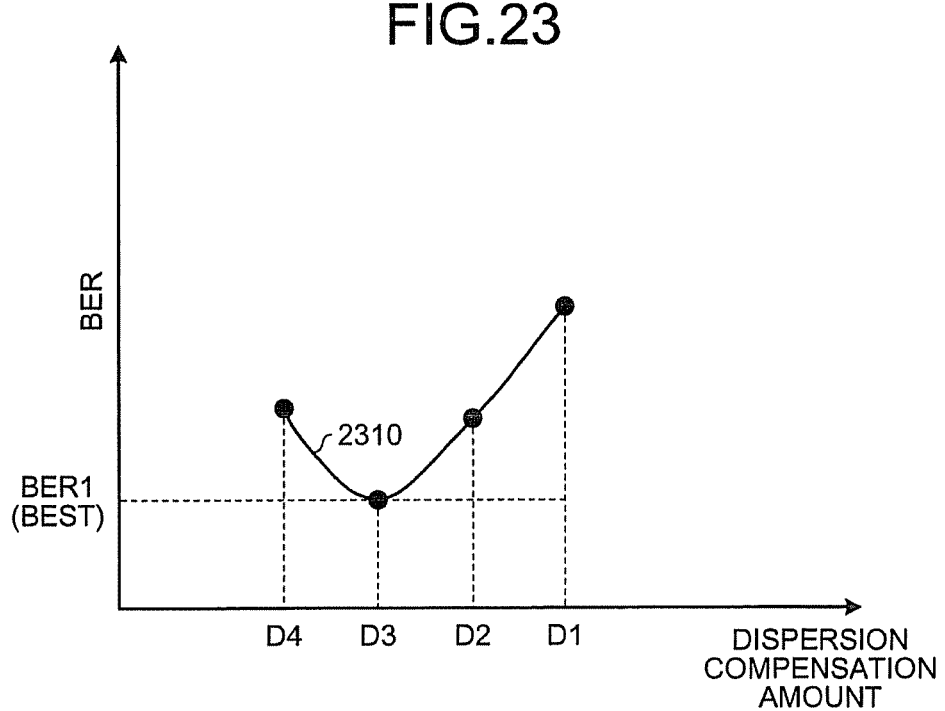
FIG. 23 is a graph of a property of the BER obtained when the central frequency is optimal.

FIG. 23 is a graph of a property of the BER obtained when the central frequency is optimal. In FIG. 23, the axis of abscissa represents the dispersion compensation amount and the axis of ordinate represents the BER. Dispersion compensation amounts D1 to D4 on the axis of abscissa are dispersion compensation amounts that correspond respectively to the properties 2211 to 2214 depicted in FIG. 22. A property 2310 is the property of the BER for a dispersion compensation amount of the tunable dispersion compensator 110 obtained when the central frequency of the tunable dispersion compensator 110 is shifted to the optical value.

As indicated by the property 2310, in this case, when the dispersion compensation amount of the tunable dispersion compensator 110 is controlled such that the BER measured by the quality measurement device 1720 is reduced, the dispersion compensation amount of the tunable dispersion compensator 110 converges on the dispersion compensation amount D3. Therefore, an optimal dispersion compensation amount for the optical signal input into the dispersion compensating apparatus 100 is the dispersion compensation amount D3.

Figure 24:
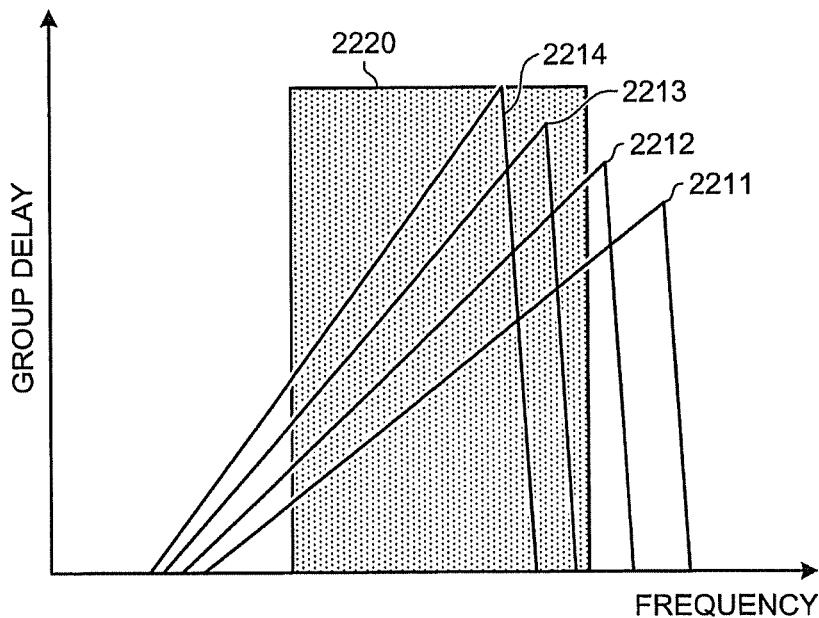
FIG. 24 is a graph of group delay properties obtained when the central frequency is not optimal.

FIG. 24 is a graph of group delay properties obtained when the central frequency is not optimal. In FIG. 24, portions identical to the portions depicted in FIG. 22 are given the same reference numerals used in FIG. 22 and will not again be described. The properties 2211 to 2214 of FIG. 24 represent the group delay properties corresponding to dispersion compensation amounts obtained when the central frequency of the tunable dispersion compensator 110 is not the optimal value.

As depicted in FIG. 24, when the central frequency of the tunable dispersion compensator 110 is not the optimal value, the band 2220 includes the group delay ripples of the properties 2211 and 2212. Therefore, when the dispersion compensation amount of the tunable dispersion compensator 110 is varied according to the property 2211 or 2212, the band occupied by the optical signal input into the tunable dispersion compensator 110 includes the group delay ripple.

Figure 25:
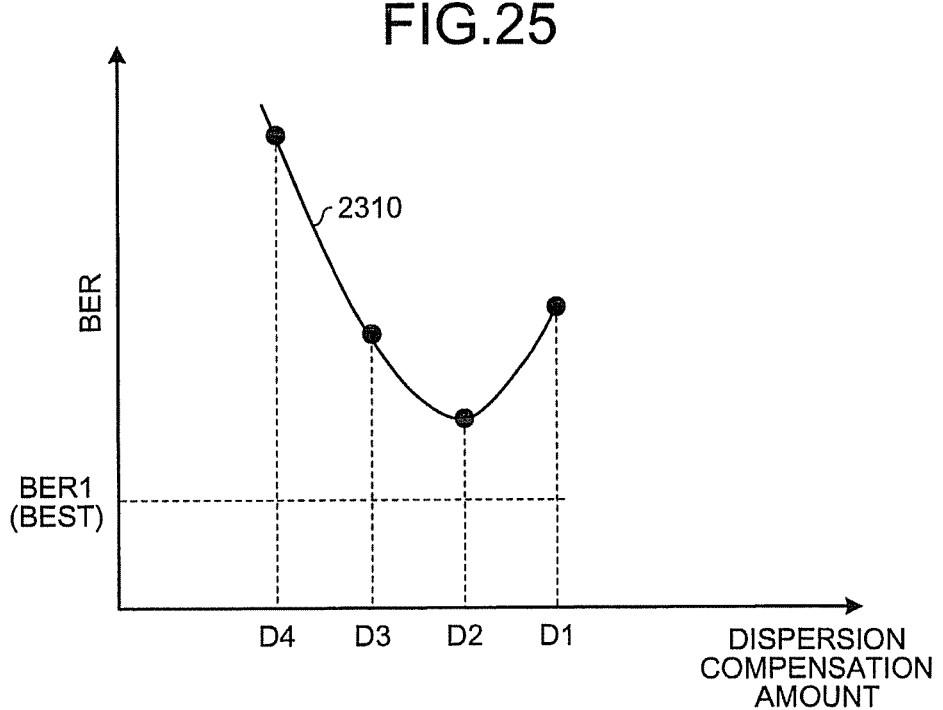
FIG. 25 is a graph of a property of the BER obtained when the central frequency is not optimal.

FIG. 25 is a graph of a property of the BER obtained when the central frequency is not optimal. In FIG. 25, portions identical to the portions depicted in FIG. 23 are given the same reference numerals used in FIG. 23 and will not again be described. The property 2310 depicted in FIG. 25 is the property of the BER for the dispersion compensation amount of the tunable dispersion compensator 110 obtained when the central frequency of the tunable dispersion compensator 110 is not the optimal value.

As indicated by the property 2310, in this case, due to the influence of the group delay ripple outside the effective band, the property of the BER for the dispersion compensation amount in the tunable dispersion compensator 110 is different from the property depicted in FIG. 23. Therefore, when the BER is converged on the minimum BER based on the property 2310 depicted in FIG. 25, the dispersion compensation amount converges on the dispersion compensation amount D2 and does not converge on the dispersion compensation amount D3 (see FIG. 23).

As described, in a case where the central frequency of the tunable dispersion compensator 110 is not the optimal value, even when the dispersion compensation amount is converged such that the BER becomes the minimum BER, the dispersion compensation amount that is optimal may not be obtained. In contrast, the dispersion compensation amount and the central frequency may alternately be caused to approach respective optimal values by executing, several times, the series of operations including the control of the dispersion compensation amount and the control of the central frequency (see FIG. 21).

As described, the optical receiving apparatus 1700 according to the third embodiment shifts the central frequency of the tunable dispersion compensator 110 in the shift direction for the quality of the optical signal that is dispersion-compensated by the tunable dispersion compensator 110 to be improved. Thereby, when the group delay property of the tunable dispersion compensator 110 is known in advance, the large group delay ripple in the group delay property may be shifted from the band occupied by the optical signal by using the asymmetry of the group delay property in the bands outside the effective band.

Therefore, even when the effective band of the tunable dispersion compensator 110 is narrower than the band occupied by the optical signal, degradation of the optical signal due to the group delay ripple outside the effective band of the group delay property can be controlled. Especially, in the tunable dispersion compensator 110 having a transmission band that is sufficiently wide relative to the dispersion band, degradation of the signal quality due to the narrowing of the optical spectrum of the signal can be controlled and by preventing degradation of the signal due to the group delay ripple, the quality of the optical signal can be improved significantly.

Feedback control that feeds back the quality of the optical signal is established and therefore, the central frequency of the tunable dispersion compensator 110 can be shifted precisely to the optimal value. Even when the group delay property of the tunable dispersion compensator 110 varies, the central frequency of the tunable dispersion compensator 110 can be set to be the optimal value corresponding to the variation of the group delay property of the tunable dispersion compensator 110. The quality of the optical signal is directly measured by receiving the optical signal and therefore, the central frequency of the tunable dispersion compensator 110 can be shifted precisely to the optimal value.

Figure 26:
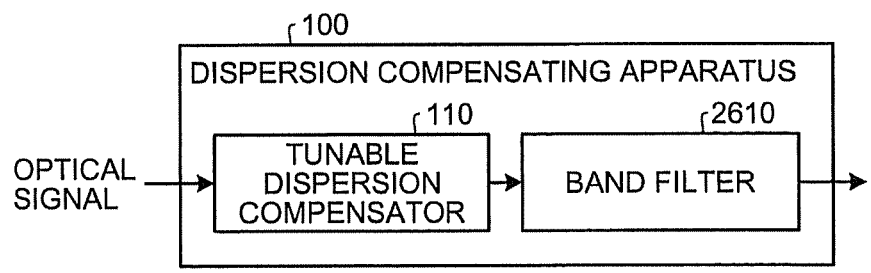
FIG. 26 is a block diagram of a dispersion compensating apparatus according to a fourth embodiment.

FIG. 26 is a block diagram of a dispersion compensating apparatus according to a fourth embodiment. In FIG. 26, the tunable dispersion compensator 110 is identical to that depicted in FIG. 1 and will not again be described. However, the group delay property of the tunable dispersion compensator 110 according to the fourth embodiment may not be asymmetrical in the bands outside the effective band.

As depicted in FIG. 26, the dispersion compensating apparatus 100 according to the fourth embodiment includes the tunable dispersion compensator 110 and a band filter 2610. The band filter 2610 is provided downstream from the tunable dispersion compensator 110. The band filter 2610 transmits an optical signal that has been dispersion-compensated by the tunable dispersion compensator 110.

The band filter 2610 attenuates the bands outside the effective band of the tunable dispersion compensator 110 in the optical signal transmitted therethrough. The band filter 2610 is, for example, a filter that has a cyclic transmission property for the wavelength or a BPF. The optical signal transmitted through the band filter 2610 is output to an external destination. The band filter 2610 may be provided upstream from the tunable dispersion compensator 110.

Figure 27:
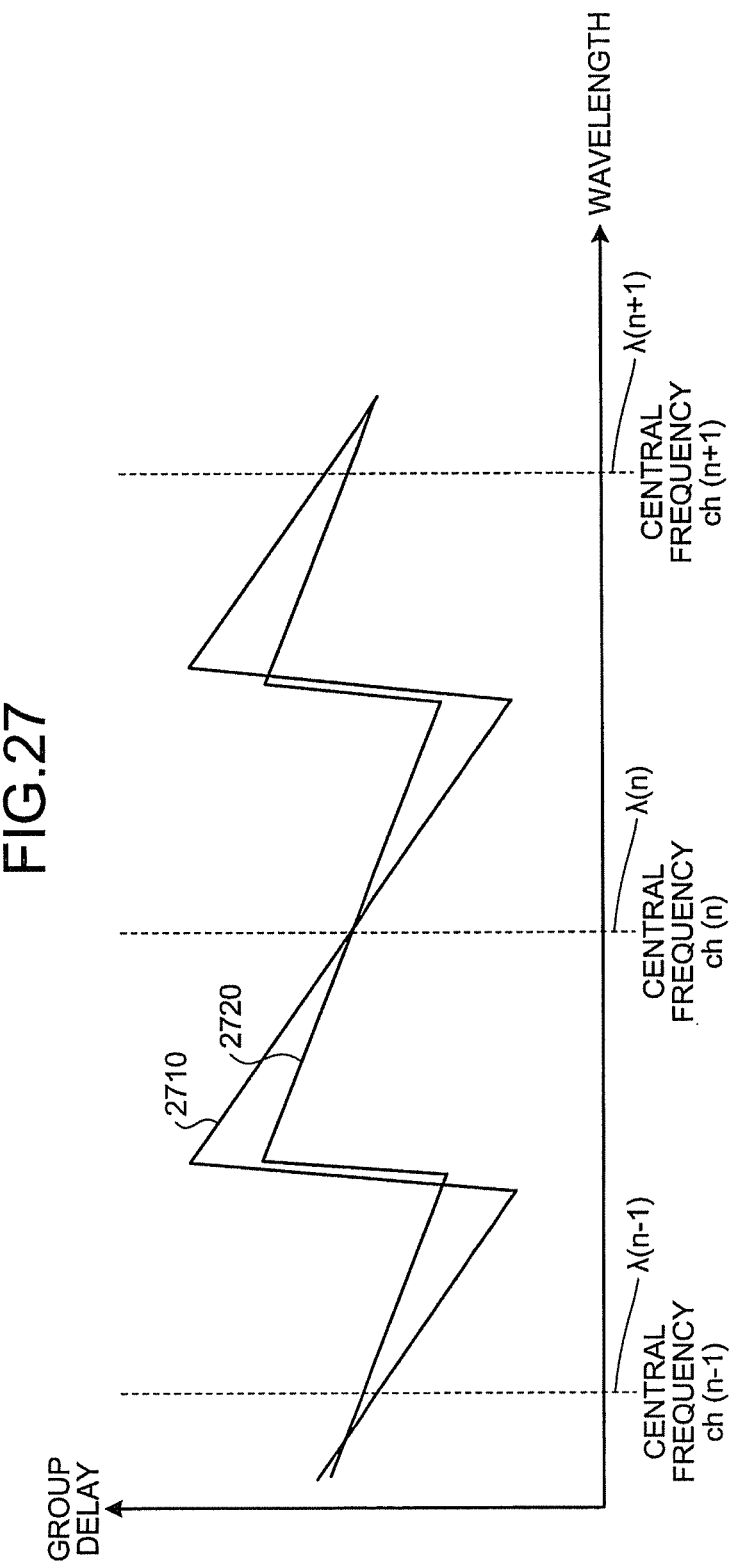
FIG. 27 is a graph of examples of the group delay property of the tunable dispersion compensator depicted in FIG. 26.

FIG. 27 is a graph of examples of the group delay property of the tunable dispersion compensator depicted in FIG. 26. In FIG. 27, the axis of abscissa represents the wavelength and the axis of ordinate represents the group delay. Properties 2710 and 2720 each represent the group delay property of the tunable dispersion compensator 110 depicted in FIG. 26. The property 2720 has a milder slope in the effective band than the property 2710.

Therefore, when the group delay property of the tunable dispersion compensator 110 is the property 2720, the dispersion compensation amount for the optical signal is smaller than that of when the group delay property of the tunable dispersion compensator 110 is the property 2710. As indicated by the properties 2710 and 2720, the group delay property of the tunable dispersion compensator 110 cyclically has effective bands with respect to wavelength.

"ch(n−1)", "ch(n)", and "ch(n+1)" denote signal channels that are included in an optical signal input into the tunable dispersion compensator 110. The signal channels denoted by "ch(n−1)", "ch(n)", and "ch(n+1)" are allocated respectively to central wavelengths $\lambda(n-1)$, $\lambda(n)$, and $\lambda(n+1)$ of the effective bands.

Figure 28:
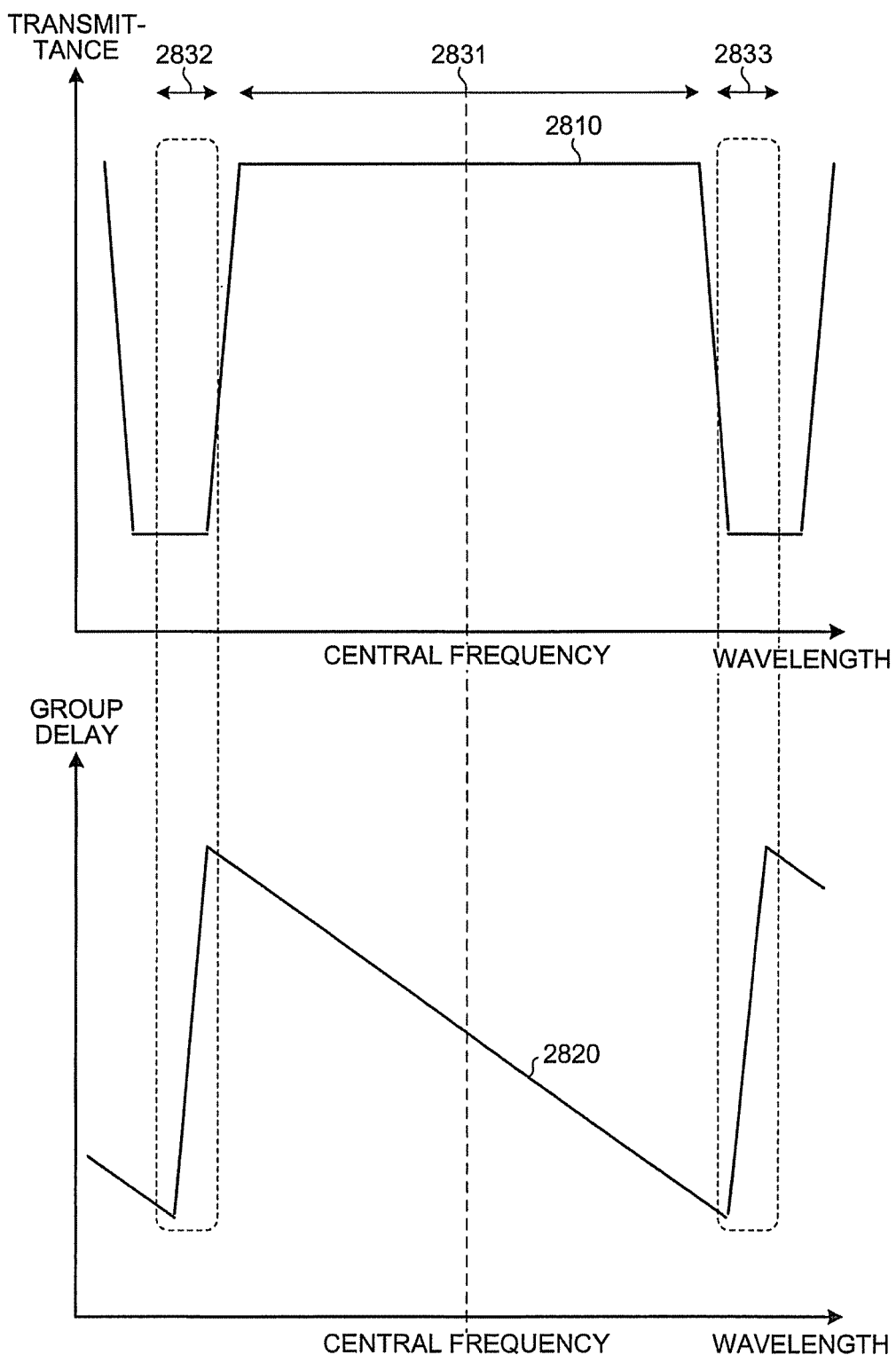
FIG. 28 is a reference graph of an example of the properties obtained when a VIPA is used as the tunable dispersion compensator.

FIG. 28 is a reference graph of an example of the properties obtained when a VIPA is used as the tunable dispersion compensator. For reference, an example will be described where the VIPA is used instead of the tunable dispersion compensator 110 depicted in FIG. 26. In FIG. 28, a property 2810 is the property of the transmittance of the VIPA for wavelengths. A property 2820 is the property of the group delay of the VIPA for wavelengths.

An effective band 2831 represents an effective band of the property 2820. Bands 2832 and 2833 are bands outside the effective band 2831. The property 2820 has a large group delay ripple in each of the bands 2832 and 2833.

As indicated by the property 2810, though the transmission property of the VIPA is substantially constant in the effective band 2831, transmittance is low in the bands 2832 and 2933. Therefore, the signal component in the bands 2832 and 2833 each having the large group delay ripple present therein is attenuated and therefore, the influence of the group delay ripple of the property 2820 is slight.

Figure 29:
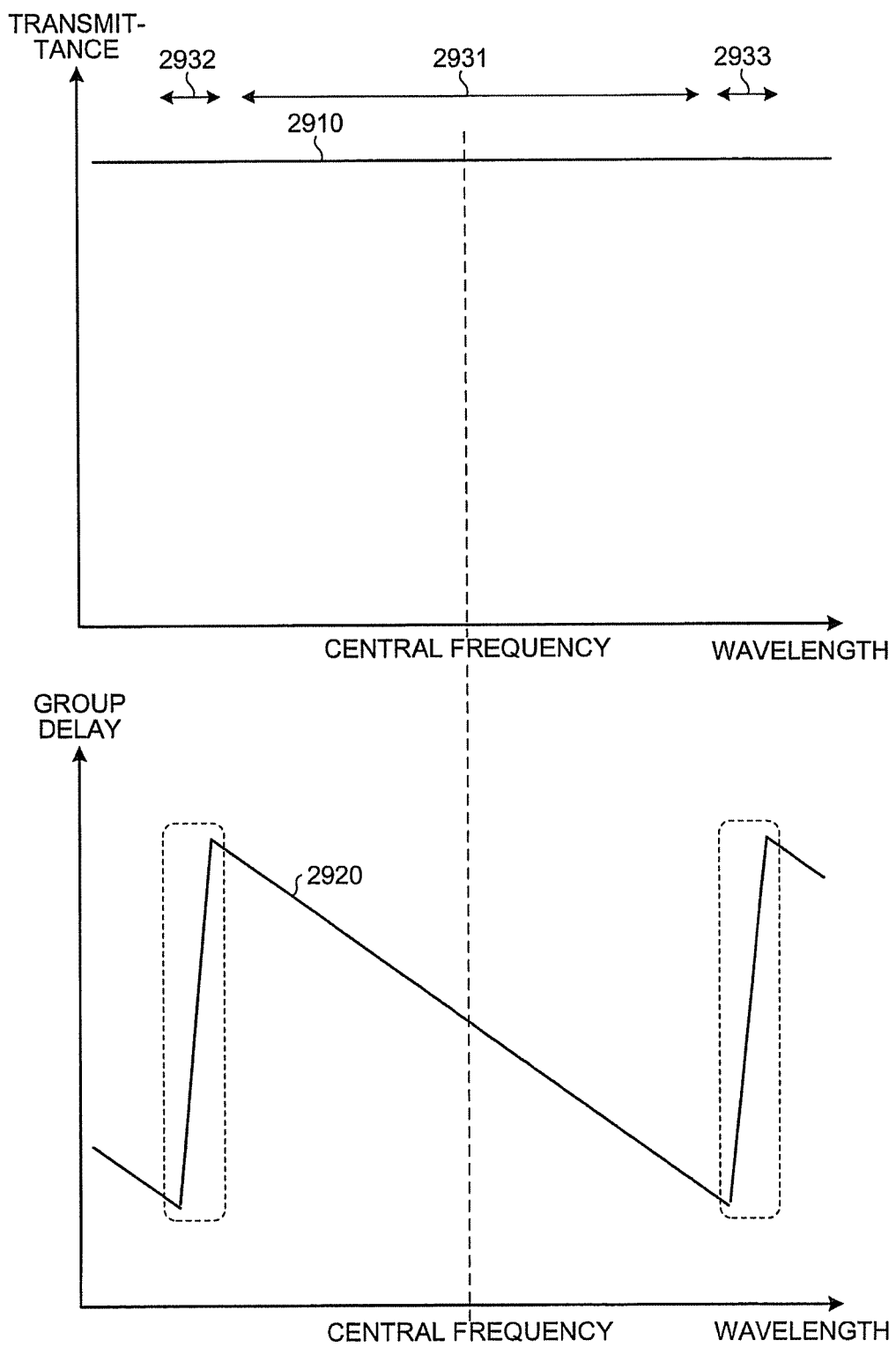
FIG. 29 is a graph of an example of the properties of the tunable dispersion compensator depicted in FIG. 26.

FIG. 29 is a graph of an example of the properties of the tunable dispersion compensator depicted in FIG. 26. An example will be described where an etalon TDC is used as the tunable dispersion compensator 110 depicted in FIG. 26. In FIG. 29, a property 2910 is a property of the transmittance of the tunable dispersion compensator 110 against the wavelength. A property 2920 is a property of the group delay of the tunable dispersion compensator 110 against the wavelength.

An effective band 2931 represents an effective band of the property 2920. Properties 2932 and 2933 are bands outside the effective band 2931. It is assumed in this example that the property 2920 of the tunable dispersion compensator 110 is same as the property 2820 depicted in FIG. 28. Therefore, the effective band 2931 and the bands 2932 and 2933 are same as the effective 2831 and the bands 2832 and 2833 depicted in FIG. 28.

As indicated by the property 2910, in the tunable dispersion compensator 110 depicted in FIG. 26, the transmission band is sufficiently wide relative to the effective band 2831 and the bands 2832 and 2833 of the group delay property. Therefore, the signal component in the bands 2932 and 2933 each having the large group delay ripple present therein is not attenuated and therefore, the group delay ripples of the property 2920 superposes the band occupied by the optical signal.

Figure 30:
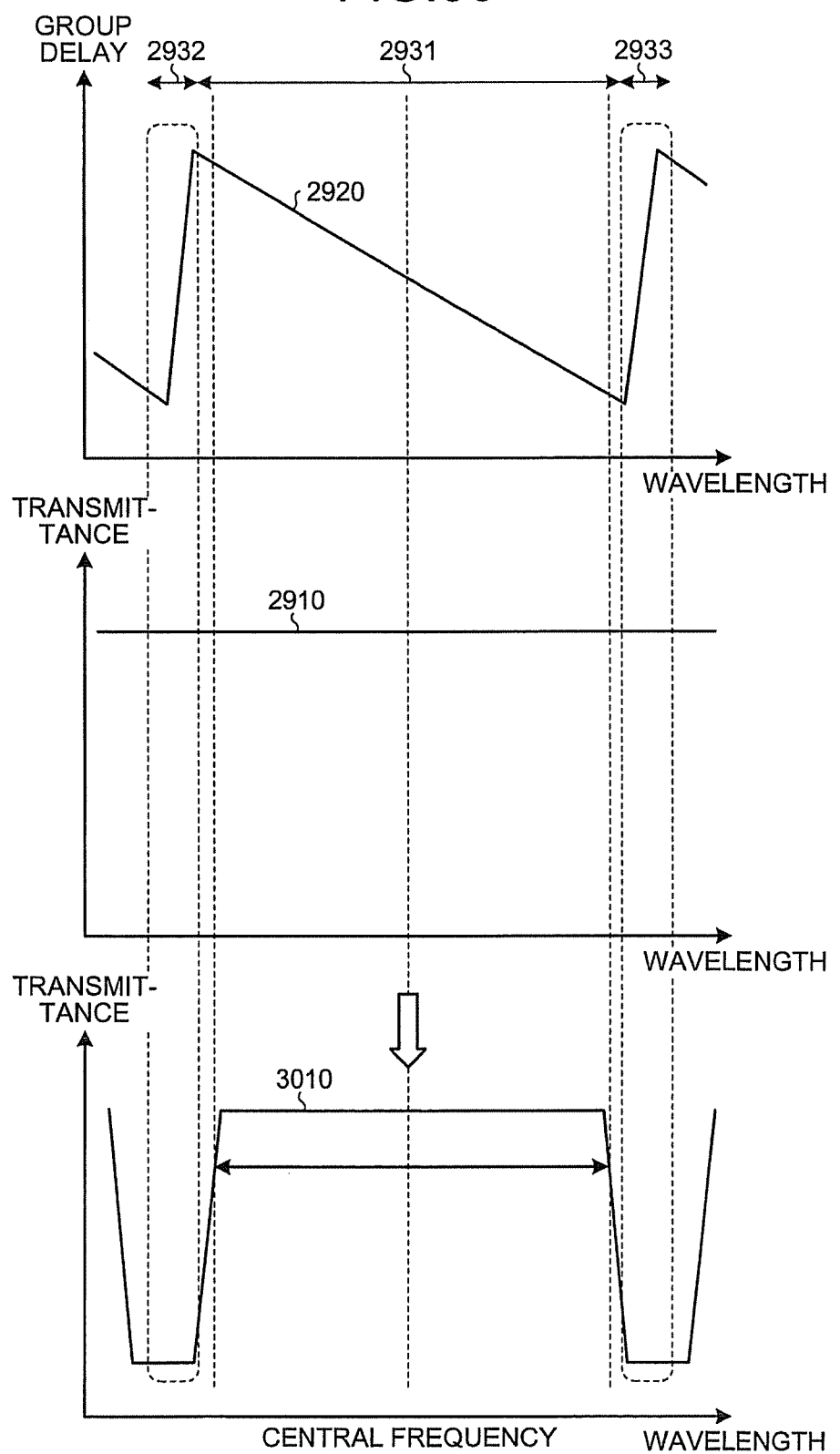
FIG. 30 is a graph of actions of the band filter depicted in FIG. 26.

FIG. 30 is a graph of actions of the band filter depicted in FIG. 26. In FIG. 30, portions identical to the portions depicted in FIG. 29 are given the same reference numerals used in FIG. 29 and will not again be described. A property 3010 represents a property of the transmittance of the band filter 2610 against the wavelength. As indicated by the property 3010, in the band filter 2610, the transmittance of each of the bands 2932 and 2933 is lower than the transmittance of the effective band 2931.

Therefore, the component in each of the bands 2932 and 2933 outside the effective band 2931 of the optical signal transmitted through the band filter 2610 is attenuated. Therefore, the signal component in the bands 2932 and 2933 each having the large group delay ripple present therein is attenuated and the influence of the group delay ripple of the property 2920 in the tunable dispersion compensator 110 is reduced.

Figure 31:
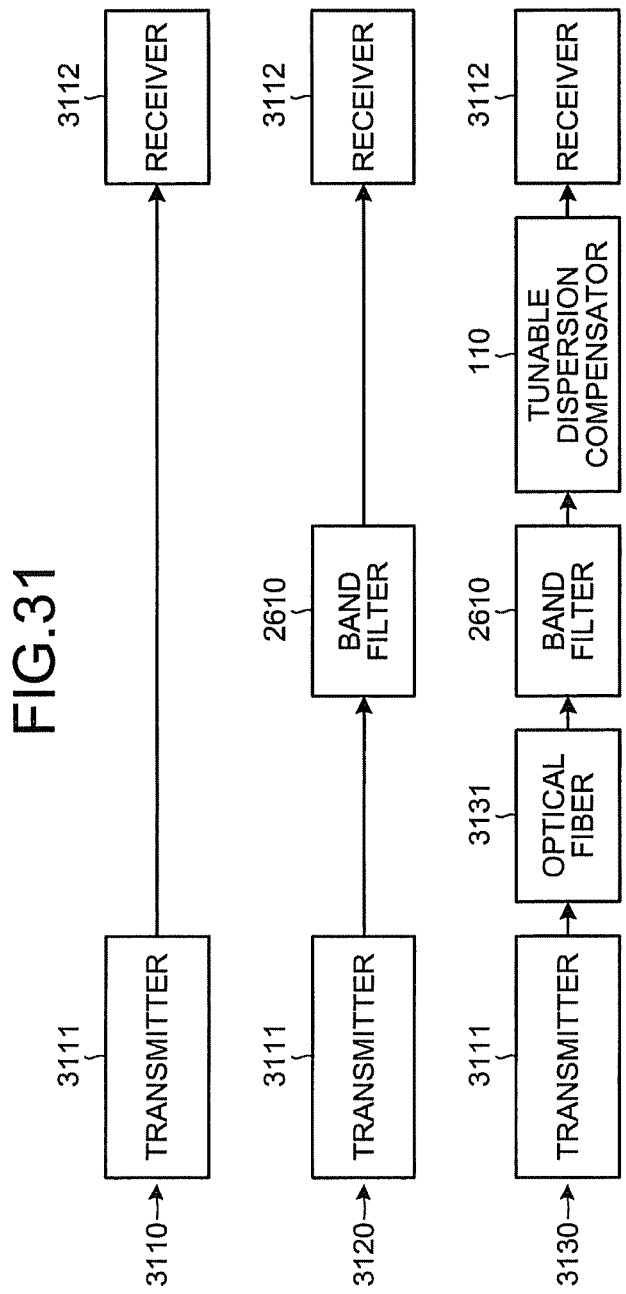
FIG. 31 is a block diagram of experimental apparatuses to verify improvement of signal quality.

FIG. 31 is a block diagram of experimental apparatuses to verify the improvement of the signal quality. The experimental apparatus 3110 includes a transmitter 3111 and a receiver 3112. In the experimental apparatus 3110, an optical signal modulated by non return to zero differential phase shift keying (NRZ-DPSK) is transmitted from the transmitter 3111 and the transmitted optical signal is directly received by the receiver 3112.

In addition to the configuration of the experimental apparatus 3110, the experimental apparatus 3120 further includes the band filter 2610 between the transmitter 3111 and the receiver 3112. This band filter 2610 is the band filter 2610 that is depicted in FIG. 26.

In addition to the configuration of the experimental apparatus 3120, the experimental apparatus 3130 further includes an optical fiber 3131 between the transmitter 3111 and the band filter 2610, and the tunable dispersion compensator 110 between the band filter 2610 and the receiver 3112. Wavelength dispersion generated in an optical signal that is propagated through the optical fiber 3131 is set to be +800 [ps/nm]. The dispersion compensation amount of the tunable dispersion compensator 110 is set to be −800 [ps/nm] matching the wavelength dispersion in the optical fiber 3131.

Figure 32:
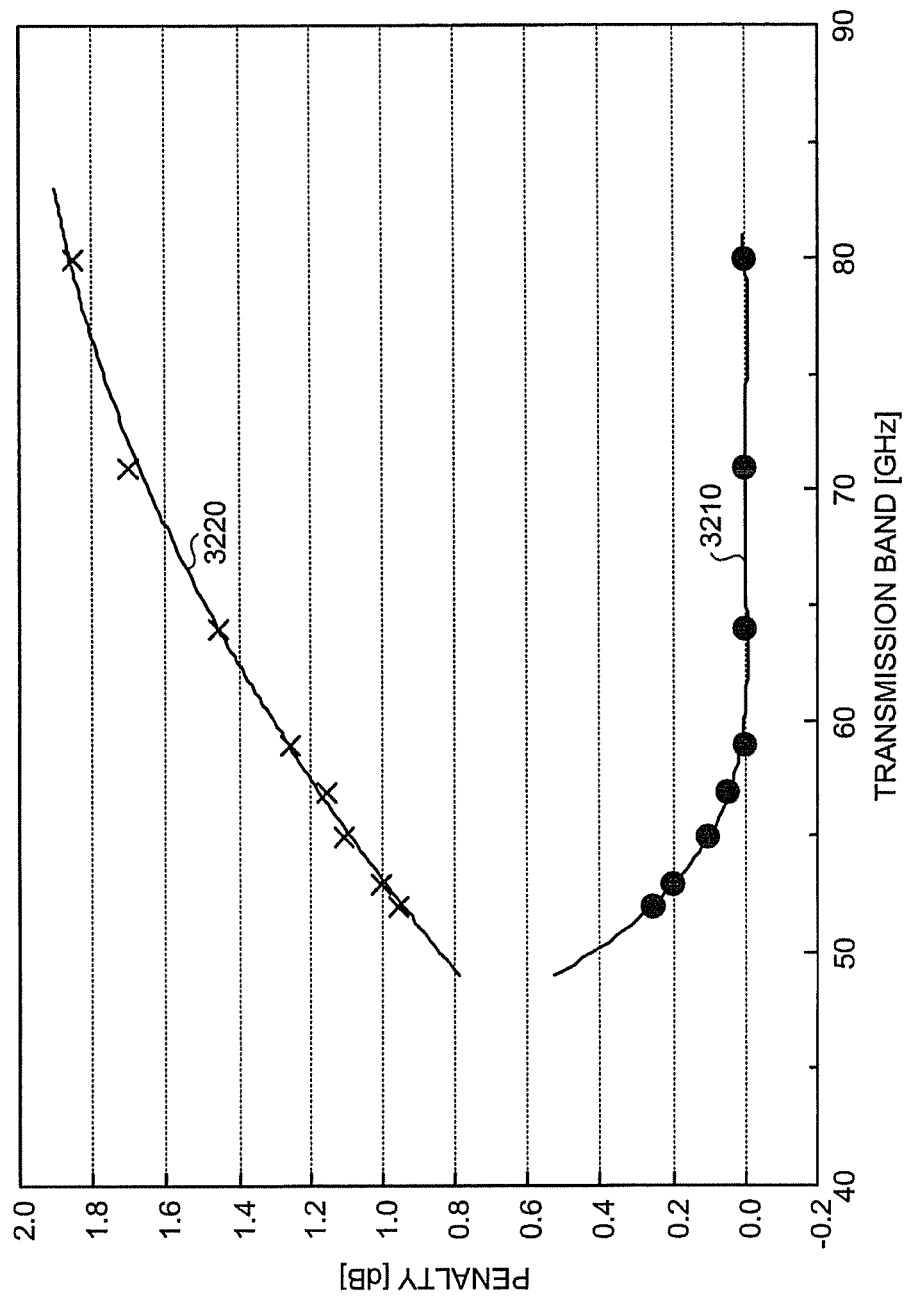
FIGS. 32 to 33 are graphs of the result of experiments executed using the experimental apparatus depicted in FIG. 31.
Figure 33:
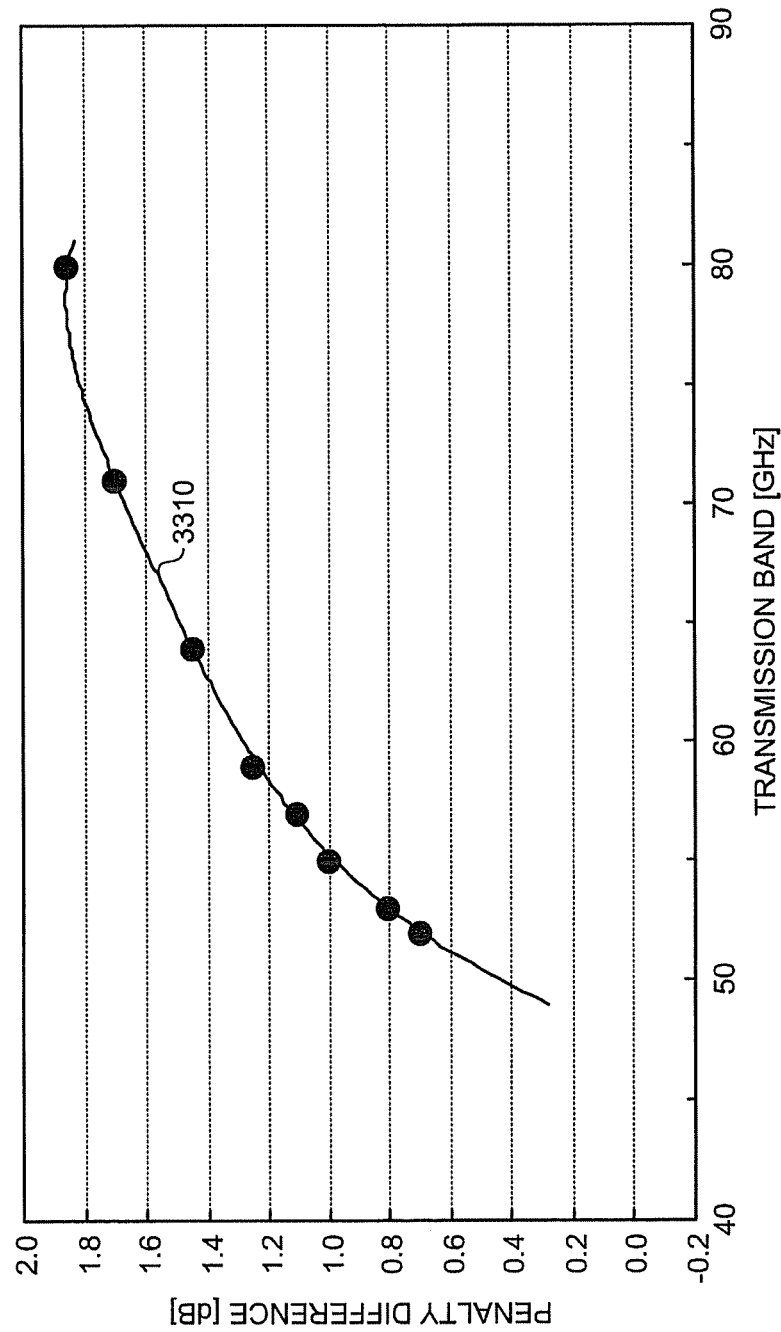

FIGS. 32 to 33 are graphs of the result of experiments executed using the experimental apparatus depicted in FIG. 31. In FIG. 32, the axis of abscissa represents a transmission band [GHz] of the band filter 2610 depicted in FIG. 31 and the axis of ordinate represents a penalty [dB] of the optical signal received by the receiver 3112. The penalty on the axis of ordinate is a penalty relative to the penalty of the optical signal that is received by the receiver 3112 of the experimental apparatus 3110 as a criterion (0 [dB]).

In FIG. 32, a property 3210 represents the property of the penalty against the transmission band of the optical signal that is received by the receiver 3112 in the experimental apparatus 3120. A property 3220 represents the property of the penalty against the transmission band of the optical signal that is received by the receiver 3112 in the experimental apparatus 3130. In FIG. 33, a property 3310 represents a difference [dB] between the properties 3210 and 3220 depicted in FIG. 32.

In the transmission band at 55 [GHz] and higher, the influence caused by the influence of the group delay ripple of the tunable dispersion compensator 110 is significant and the penalty of the property 3220 is significant. In the transmission band at 60 [GHz] and lower, the signal component is attenuated by the band filter 2610 and therefore, the penalty is significant.

In contrast, in the transmission band at 50 [GHz] and lower, the penalties in the properties 3210 and 3220 are substantially same. It is considered that this is because the signal component that is affected by the wavelength ripple of the tunable dispersion compensator 110 is cut out by the band filter 2610. Therefore, the quality of the optical signal is improved by providing the band filter 2610 downstream from or upstream from the tunable dispersion compensator 110.

Figure 34:
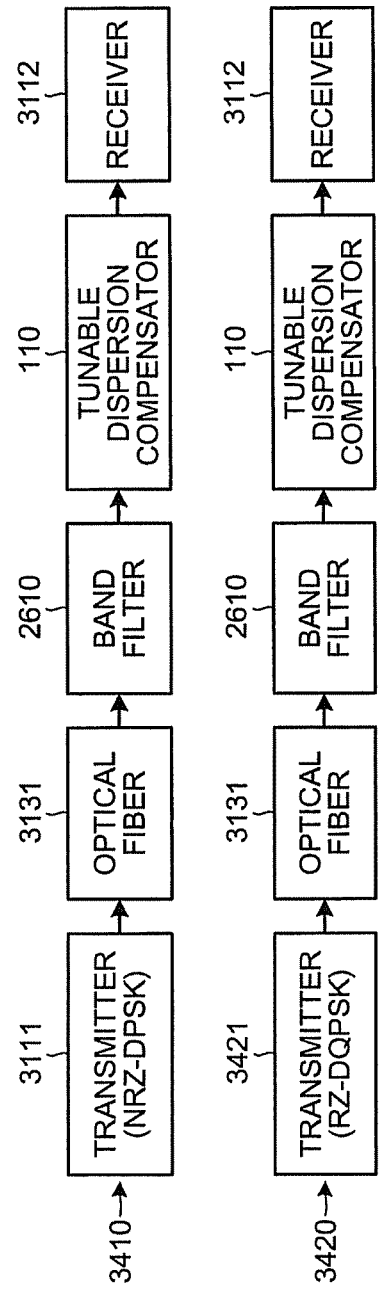
FIG. 34 is a block diagram of experimental apparatuses to verify the influence of spectrum width.

FIG. 34 is a block diagram of experimental apparatuses to verify the influence of the spectrum width. In FIG. 34, components identical to those depicted in FIG. 31 are given the same reference numerals used in FIG. 31 and will not again be described. The experimental apparatus 3410 is an apparatus that includes the receiver 3111, the optical fiber 3131, the band filter 2610, the tunable dispersion compensator 110, and the receiver 3112. The experimental apparatus 3420 is an apparatus that includes a transmitter 3421 instead of the transmitter of the experimental apparatus 3110. The transmitter 3421 transmits an optical signal that is modulated by RZ-DQPSK.

Figure 35:
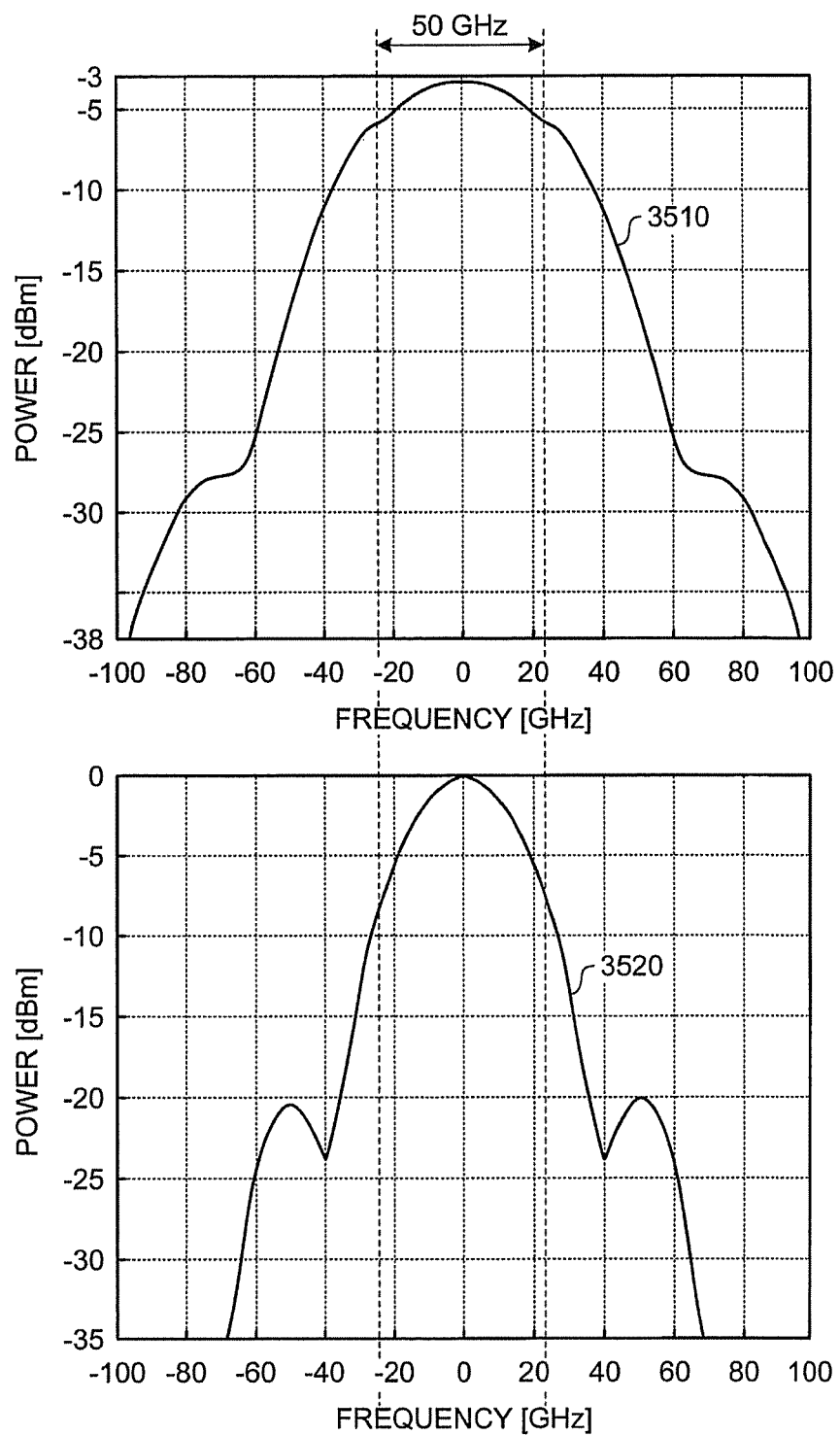
FIGS. 35 and 36 are graphs of the results of an experiment executed using the experimental apparatuses depicted in FIG. 34.

FIG. 35 is graphs of the results of the experiment executed using the experimental apparatuses depicted in FIG. 34. In FIG. 35, the axis of abscissa represents the frequency [GHz] and the axis of ordinate represents the power of the optical signal [dBm]. A spectrum 3510 represents an optical signal that is transmitted by the transmitter 3111 of the experimental apparatus 3410 depicted in FIG. 34.

A spectrum 3520 represents an optical signal transmitted by the transmitter 3421 of the experimental apparatus 3420 depicted in FIG. 34. As indicated by the spectrums 3510 and 3520, the optical signal (RZ-DQPSK) transmitted by the transmitter 3421 has a spectrum width that is narrower than that of the optical signal (NRZ-DPSK) transmitted by the transmitter 3111.

Figure 36:
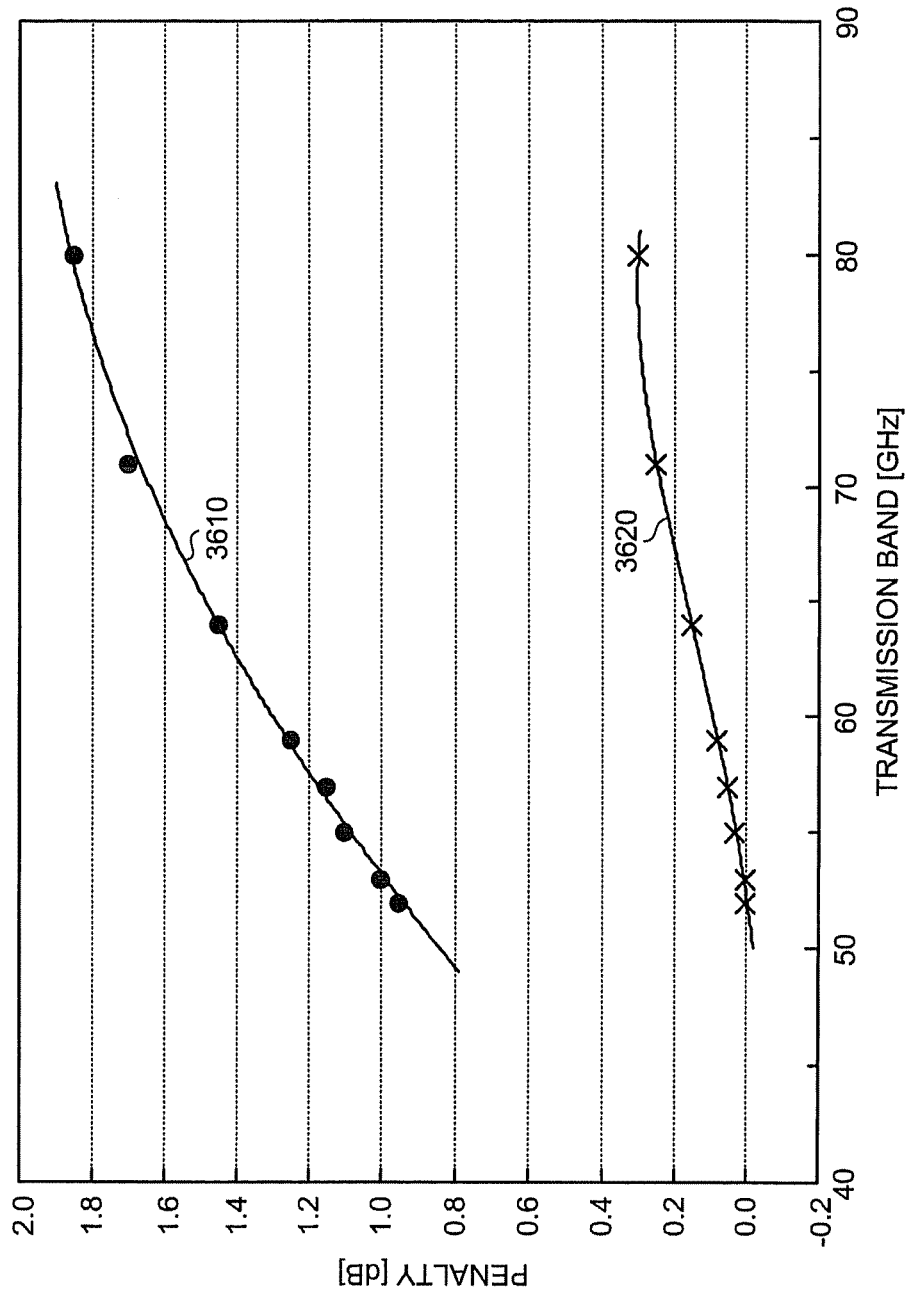

FIG. 36 is another graph of the results of the experiment executed using the experimental apparatus depicted in FIG. 34. The axes of abscissa and ordinate in FIG. 36 are the same as the axes of abscissa and ordinate of FIG. 32 and will not again be described. A property 3610 represents a property of the penalty against the transmission band of the optical signal received by the receiver 3112 of the experimental apparatus 3410. A property 3620 represents a property of the penalty against the transmission band of the optical signal received by the receiver 3112 of the experimental apparatus 3420.

As indicated by the property 3610, the spectrum width of the optical signal (NRZ-DPSK) transmitted by the transmitter 3111 is wide (see FIG. 35) and therefore, many frequency components overlap the wavelength ripple of the tunable dispersion compensator 110. Hence, the penalty of the optical signal transmitted by the transmitter 3111 is significant due to the influence of the wavelength ripple of the tunable dispersion compensator 110.

As indicated by the property 3620, the spectrum width of the optical signal (RZ-DQPSK) transmitted by the transmitter 3421 is narrow (see FIG. 35) and therefore, few frequency components overlap the wavelength ripple of the tunable dispersion compensator 110. Hence, the penalty of the optical signal transmitted by the transmitter 3421 is small since the influence of the wavelength ripple of the tunable dispersion compensator 110 is small.

Figure 37:
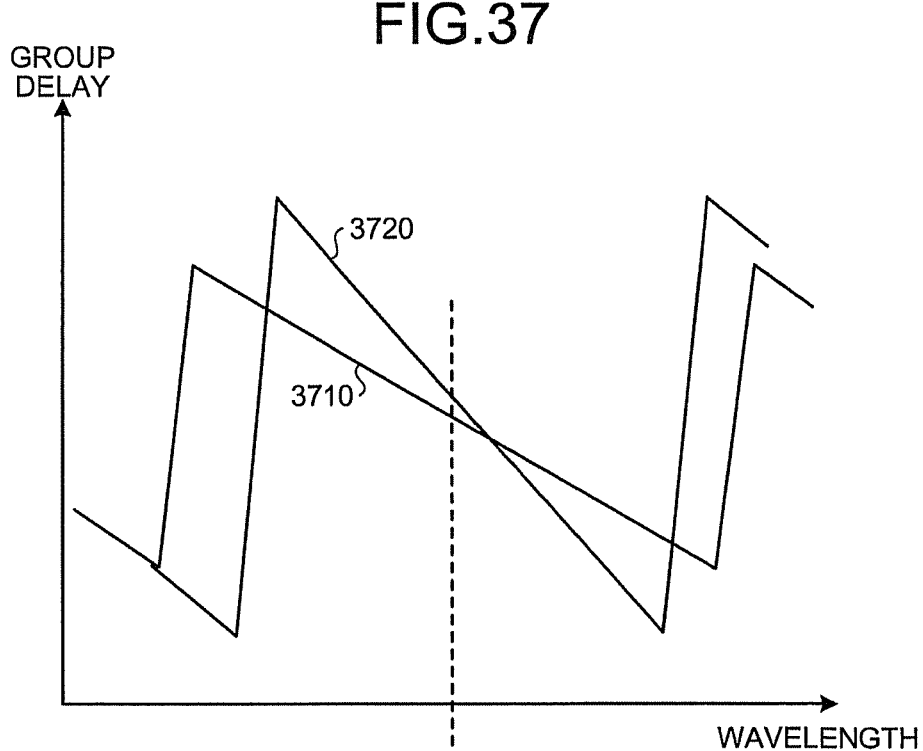
FIGS. 37 and 38 are graphs of extension of the range of the dispersion compensation.
Figure 38:
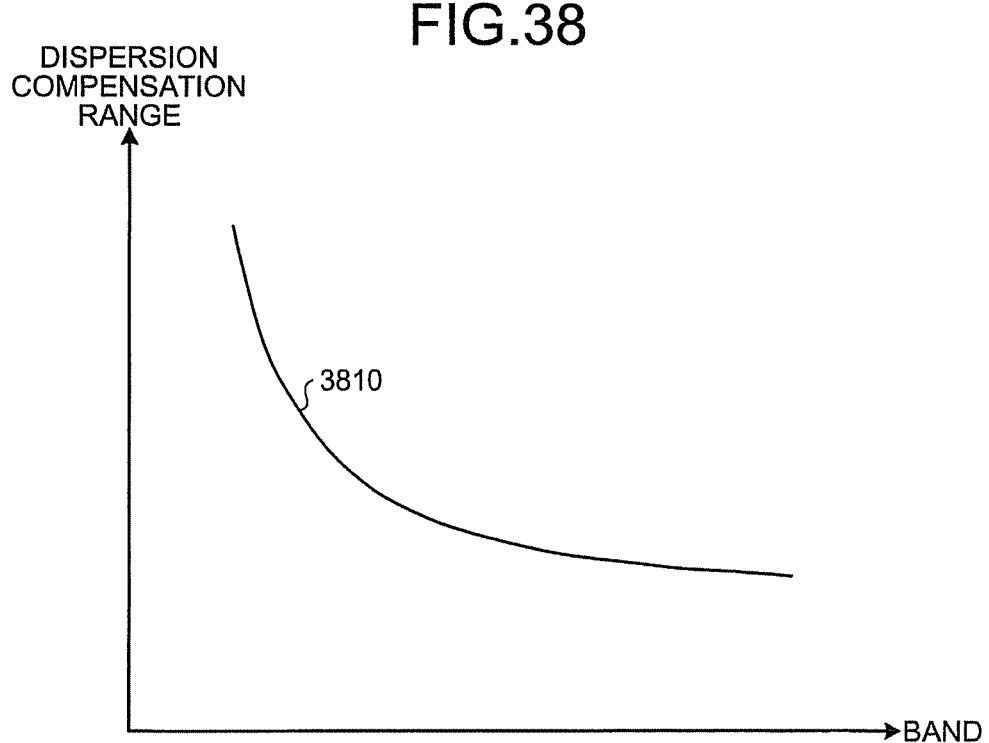

FIGS. 37 and 38 are graphs of extension of the range of the dispersion compensation. In FIG. 37, the axis of abscissa represents the wavelength and the axis of ordinate represents the group delay. Properties 3710 and 3720 each represent a group delay property of the tunable dispersion compensator 110. In FIG. 38, the axis of abscissa represents the size of the effective band of the tunable dispersion compensator 110 and the axis of ordinate represents the range of the dispersion compensation of the tunable dispersion compensator 110. A relation 3810 of FIG. 38 represents the relation between the range of the dispersion compensation and the effective band of the tunable dispersion compensator 110.

The range of the dispersion compensation and the effective band of the tunable dispersion compensator 110 are generally in a trading-off relation with each other. For example, the effective band may be widened when the range of the dispersion compensation of the tunable dispersion compensator 110 is set to be narrow like the property 3710. The effective band is narrowed when the range of the dispersion compensation of the tunable dispersion compensator 110 is set to be wide like the property 3720.

Therefore, when it is desired that the dispersion compensation amount of the tunable dispersion compensator 110 is set to be large, the effective band of the tunable dispersion compensator 110 is set to be narrow matching the modulation scheme of the optical signal (for example, RZ-DQPSK). Degradation of the quality of the optical signal can be controlled by narrowing the bandwidth of the band filter 2610 by the amount by which the effective band of the tunable dispersion compensator 110 is narrowed.

Figure 39:
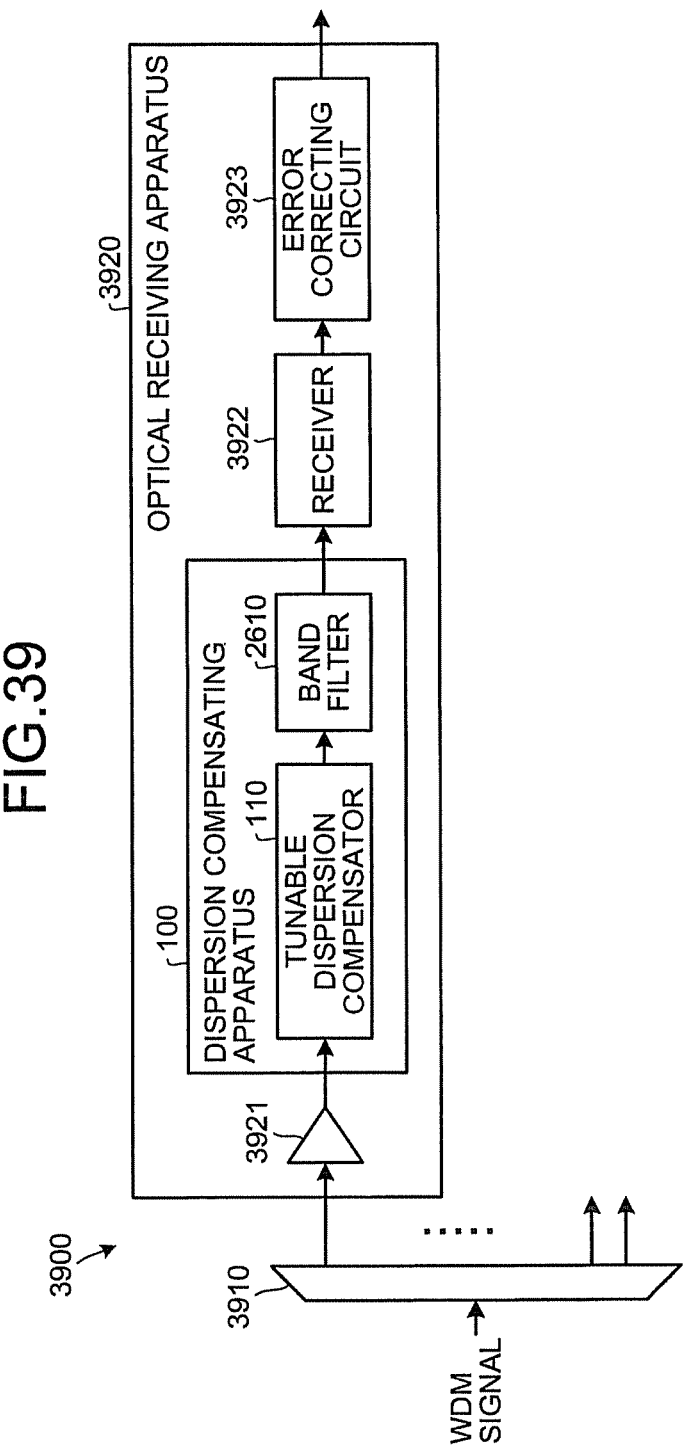
FIG. 39 is a block diagram of an example of the dispersion compensating apparatus depicted in FIG. 26.

FIG. 39 is a block diagram of an example of the dispersion compensating apparatus depicted in FIG. 26. A communication system 3900 includes a demultiplexer 3910 and an optical receiving apparatus 3920. The demultiplexer 3910 receives input of a WDM signal formed by multiplexing optical signals having different wavelengths. The demultiplexer 3910 wavelength-de-multiplexes the WDM signal input thereinto.

The demultiplexer 3910 transmits the WDM signals that are wavelength-de-multiplexed to optical receiving apparatuses each including the optical receiving apparatus 3920. The optical receiving apparatus 3920 receives one of the optical signals transmitted from the demultiplexer 3910. More specifically, the optical receiving apparatus 3920 includes an optical amplifier 3921, the dispersion compensating apparatus 100, a receiver 3922, and an error correcting circuit 3923. The optical amplifier 3921 amplifies the optical signal transmitted from the wavelength-demultiplexer and outputs the amplified optical signal to the dispersion compensating apparatus 100.

The dispersion compensating apparatus 100 dispersion-compensates the optical signal output from the optical amplifier 3921 and outputs the dispersion-compensated optical signal to the receiver 3922. The receiver 3922 receives the optical signal output from the dispersion compensating apparatus 100. The receiver 3922 outputs the signal received to the error correcting circuit 3923. The error correcting circuit 3923 corrects errors of the signal output from the receiver 3922 and outputs the signal having the errors corrected.

In this manner, the dispersion compensating apparatus 100 according to the fourth embodiment attenuates the bands outside the effective band of the tunable dispersion compensator 110 using the band filter 2610. Thereby, the components of the band that are influenced by the group delay ripple and that are in the optical signal are attenuated and therefore, degradation of the optical signal due to the group delay ripple outside the effective band of the group delay property can be controlled.

Especially, in the tunable dispersion compensator 110 having a transmission band that is sufficiently wide relative to the dispersion band, the bands outside the effective band are not attenuated by the tunable dispersion compensator 110 and therefore, by preventing the degradation of the signal due to the group delay ripple, the quality of the optical signal can be improved significantly.

Figures 40, 41:
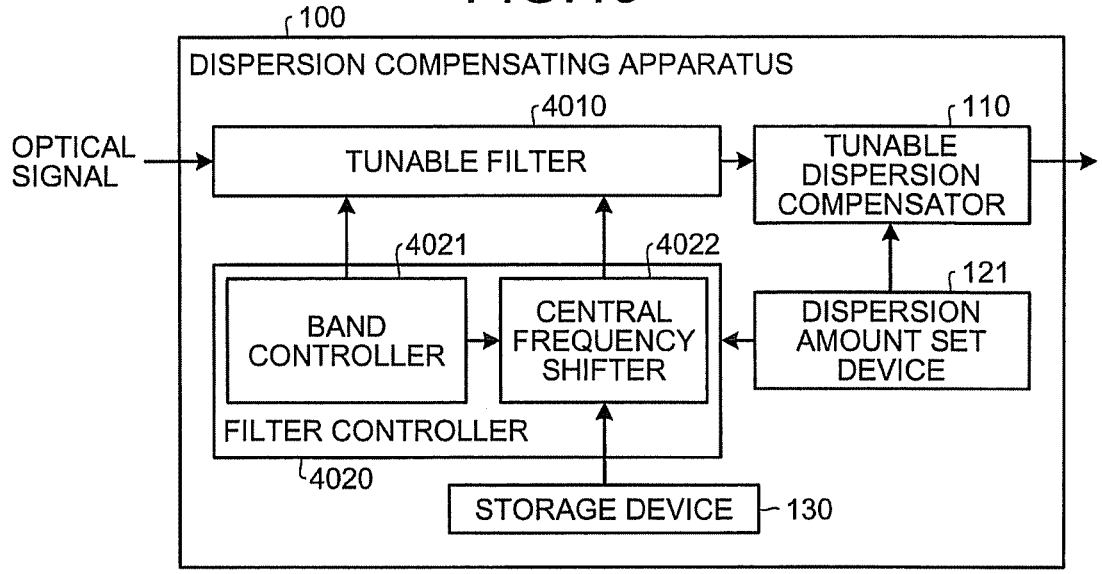
FIG. 40 is a block diagram of a dispersion compensating apparatus according to a fifth embodiment.
FIG. 41 depicts an example of a table stored by the storage device depicted in FIG. 40.

FIG. 40 is a block diagram of a dispersion compensating apparatus according to a fifth embodiment. In FIG. 40, components identical to those depicted in FIG. 1 are given the same reference numerals used in FIG. 1 and will not again be described. As depicted in FIG. 40, the dispersion compensating apparatus 100 according to the fifth embodiment includes a tunable filter 4010, the tunable dispersion compensator 110, the dispersion amount set device 121, a filter controller 4020, and the storage device 130.

The tunable filter 4010 is provided upstream from the tunable dispersion compensator 110. The tunable filter 4010 transmits therethrough an optical signal input thereto and attenuates the bands outside the effective band of the tunable dispersion compensator 110 in the optical signal transmitted therethrough. The optical signal transmitted through the tunable filter 4010 is output to the tunable dispersion compensator 110. The tunable filter 4010 may be provided downstream from the tunable dispersion compensator 110.

Filtering properties of the tunable filter 4010 may be varied by control of the filter controller 4020. A filtering property that is variable is, for example, the central frequency of the transmission property. Alternatively, a filtering property that is variable may be the bandwidth. Filtering properties that are variable may also be the central frequency of the transmission property and the bandwidth.

The group delay property of the tunable dispersion compensator 110 is a group delay property that is asymmetrical in bands outside the effective band (see FIG. 3). The transmission property of the tunable dispersion compensator 110 has a transmission band that is sufficiently wide relative to the effective band of the group delay property and the bands outside the effective band (see FIG. 3). The dispersion amount set device 121 sets the dispersion compensation amount in the tunable dispersion compensator 110. The dispersion amount set device 121 notifies the filter controller 4020 of the dispersion compensation amount set.

The filter controller 4020 controls the filtering property of the tunable filter 4010. More specifically, the filter controller 4020 includes a band controller 4021 and a central frequency shifter 4022. The band controller 4021 controls the bandwidth of the tunable filter 4010 based on the dispersion compensation amount reported by the dispersion amount set device 121.

More specifically, when the band controller 4021 is notified of the dispersion compensation amount from the dispersion amount set device 121, the band controller 4021 refers to the table stored in the storage device 130. Dispersion compensation amounts and control amounts of the bandwidth are correlated with each other in the table stored in the storage device 130. The band controller 4021 obtains the control amount that is correlated in the table with the dispersion compensation amount that is reported, and controls the bandwidth of the tunable filter 4010 using the control amount obtained.

The central frequency shifter 4022 shifts the central frequency of the transmission property of the tunable filter 4010 based on the dispersion compensation amount that is reported by the dispersion amount set device 121. More specifically, when the central frequency shifter 4022 is notified of the dispersion compensation amount from the dispersion amount set device 121, the central frequency shifter 4022 refers to the table stored in the storage device 130. The dispersion compensation amounts and shift amounts of the central frequency are correlated with each other in the table stored in the storage device 130.

The central frequency shifter 4022 obtains the shift amount that is correlated in the table with the dispersion compensation amount reported, and shifts the central frequency of the transmission property of the tunable filter 4010 using the shift amount obtained. The filtering controller 4020 may be configured to omit one among the band controller 4021 and the central frequency shifter 4022.

FIG. 41 depicts an example of the table stored by the storage device depicted in FIG. 40. The storage device 130 depicted in FIG. 40 has stored therein, for example, a table 4100. In the table 4100, dispersion compensation amounts 4110 of the tunable dispersion compensator 110, shift amounts 4120 of the central frequency of the transmission property of the tunable filter 4010, and control amounts 4130 of the bandwidth of the tunable filter 4010 are correlated with each other.

For example, it is assumed that the dispersion amount set device 121 sets the dispersion compensation amount of the tunable dispersion compensator 110 to be −100 [ps/nm]. In this case, the central frequency shifter 4022 shifts the central frequency of the transmission property of the tunable filter 4010 by "+1" (in the shift amounts 4120) correlated with "−100 [ps/nm]" (in the dispersion compensation amounts 4110) in the table 4100.

The band controller 4021 controls the bandwidth of the tunable filter 4010 by "+X1" (in the control amounts 4130) correlated with "−100 [ps/nm]" (in the dispersion compensation amounts 4110) in the table 4100.

The values of an optimal shift amount 4120 and an optimal control amount 4130 for each of the dispersion compensation amounts 4110 depend on the group delay property. To create the table 4100, for example, the optical signal is dispersion-compensated by the tunable dispersion compensator 110 varying the shift amount 4120 and the control amount 4130 by a specific dispersion compensation amount 4110.

The shift amount 4120 and the control amount 4130 that are obtained when the quality of the optical signal dispersion-compensated by the tunable dispersion compensator 110 becomes highest are correlated with the dispersion compensation amount 4110. The table 4100 may be created by correlating the shift amount 4120 and the control amount 4130 with the dispersion compensation amount 4110 in the same manner varying the value of the dispersion compensation amount 4110.

A case has been described above where the shift amounts 4120 and the control amounts 4130 are correlated with the dispersion compensation amounts 4110. However, when the dispersion compensating apparatus 100 is adapted to omit the band controller 4021, the control amounts 4130 may be omitted from the table 4100. When the dispersion compensating apparatus 100 is adapted to omit the central frequency shifter 4022, the shift amounts 4120 may be omitted from the table 4100.

The example of the operations of the dispersion compensating apparatus 100 depicted in FIG. 40 is same as the operations depicted in FIG. 7. However, at step S702 of FIG. 7, the band controller 4021 obtains the control amount that corresponds to the dispersion compensation amount set at step S701 from the storage device 130. At step S703, the band controller 4021 controls the bandwidth of the tunable filter 4010 using the control amount obtained at step S702.

Otherwise, at step S702 of FIG. 7, the central frequency shifter 4022 obtains the shift amount that corresponds to the dispersion compensation amount set at step S701 from the table of the storage device 130. At step S703, the central frequency shifter 4022 shifts the central frequency of the transmission property of the tunable filter 4010 using the shift amount obtained at step S702. Otherwise, these operations of the band controller 4021 and the central frequency shifter 4022 may concurrently be executed.

As described, the dispersion compensating apparatus 100 according to the fifth embodiment controls the filtering property of the tunable filter 4010 based on the dispersion compensation amount of the tunable dispersion compensator 110.

Thereby, when the group delay property of the tunable dispersion compensator 110 is known in advance, a large group delay ripple of the group delay property can be shifted from the band occupied by the optical signal using the asymmetry of the group delay property in the bands outside the effective band.

Therefore, even when the effective band of the tunable dispersion compensator 110 is narrower than the band occupied by the optical signal, degradation of the optical signal due to the group delay ripple outside the effective band of the group delay property can be controlled. Especially, in the tunable dispersion compensator 110 having a transmission band that is sufficiently wide relative to the dispersion band, degradation of the signal quality due to the narrowing of the optical spectrum of the signal can be controlled and by preventing the degradation of the signal due to the group delay ripple, the quality of the optical signal can be improved significantly.

The dispersion compensation amounts and the control amounts of the filtering property are stored correlated with each other and the filtering property of the tunable filter 4010 is controlled using the control amount that is correlated with the dispersion compensation amount set by the set device. Thereby, feed-forward control is established and therefore, the central frequency of the tunable dispersion compensator 110 may be shifted at a high speed to an optimal value therefor. Compared to a case where a feedback system is provided, the dispersion compensating apparatus 100 can be implemented with a simpler configuration.

A case has been described where the group delay property of the tunable dispersion compensator 110 is a group delay property that is asymmetrical in the bands outside the effective band. However, when control of the bandwidth of the tunable filter 4010 is executed by the band controller 4021, the group delay property of the tunable dispersion compensator 110 may also be symmetrical in the bands outside the effective band.

Figure 42:
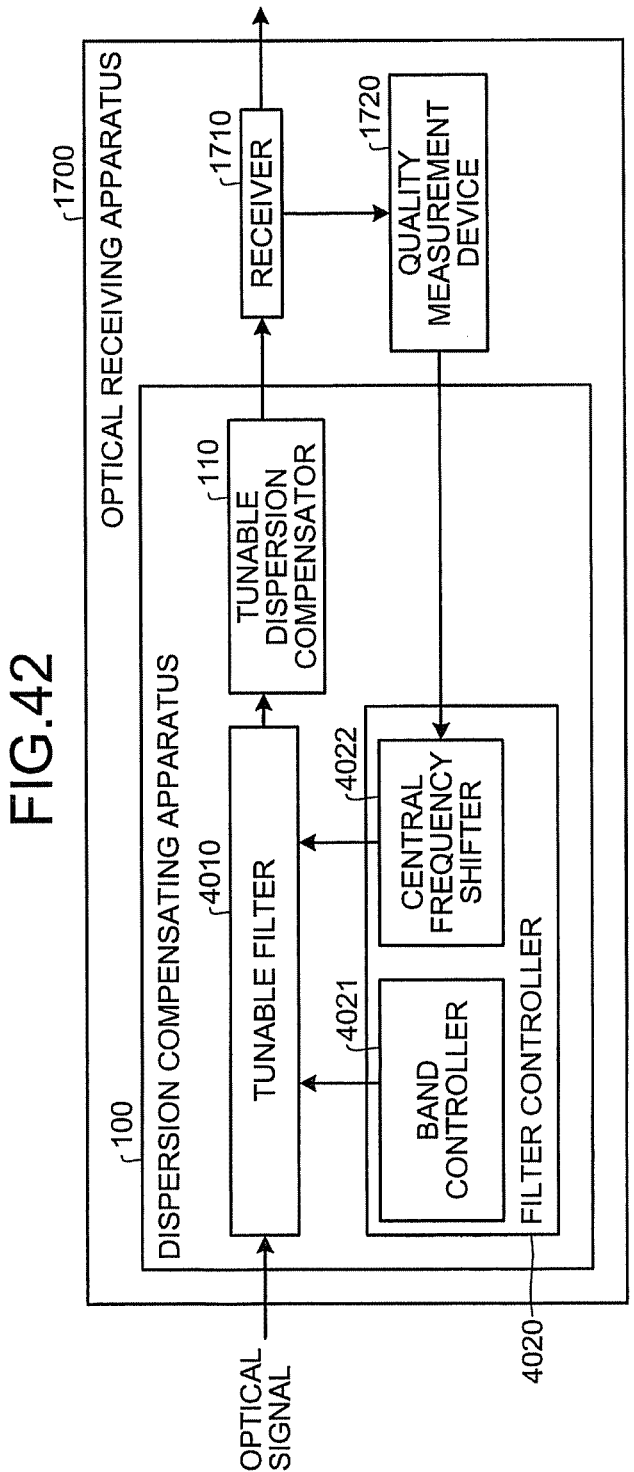
FIG. 42 is a block diagram of a dispersion compensating apparatus according to a sixth embodiment.

FIG. 42 is a block diagram of a dispersion compensating apparatus according to a sixth embodiment. In FIG. 42, components identical to those depicted in FIG. 40 or FIG. 17 are given the same reference numerals used in FIG. 40 or FIG. 17 and will not again be described. As Depicted in FIG. 42, the optical receiving apparatus 1700 according to the sixth embodiment includes the dispersion compensating apparatus 100, the receiver 1710, and the quality measurement device 1720.

In the sixth embodiment, the dispersion compensating apparatus 100 may be adapted to omit the storage device 130 (see FIG. 40). The quality measurement device 1720 measures the quality of the signal output from the receiver 1710 and notifies the filter controller 4020 of the quality measured.

The band controller 4021 of the filter controller 4020 controls the bandwidth of the tunable filter 4010 in a control direction for the quality reported by the quality measurement device 1720 to be improved. The central frequency shifter 4022 of the filter controller 4020 shifts the central frequency of the transmission property of the tunable filter 4010 in the control direction for the quality reported by the quality measurement device 1720 to be improved.

The example of the operations of the dispersion compensating apparatus 100 depicted in FIG. 42 are same as the operations depicted in FIG. 20 or 21. However, at step S2002 of FIG. 20, the band controller 4021 makes the initial settings of the bandwidth of the tunable filter 4010. At step S2007, the band controller 4021 determines whether the BER measured at step S2006 is the minimum BER. At step S2008, the band controller 4021 controls the bandwidth of the tunable filter 4010.

At step S2002, the central frequency shifter 4022 makes the initial settings of the central frequency of the transmission property of the tunable filter 4010. At step S2007, the central frequency shifter 4022 determines whether the BER measured at step S2006 is the minimum BER. At step S2008, the central frequency shifter 4022 shifts the central frequency of the transmission property of the tunable filter 4010.

Steps S2002, S2007, and S2109 described above may be executed at steps S2102, S2107, and S2109 of FIG. 21. These operations of the band controller 4021 and the central frequency shifter 4022 may be executed concurrently.

Figure 43:
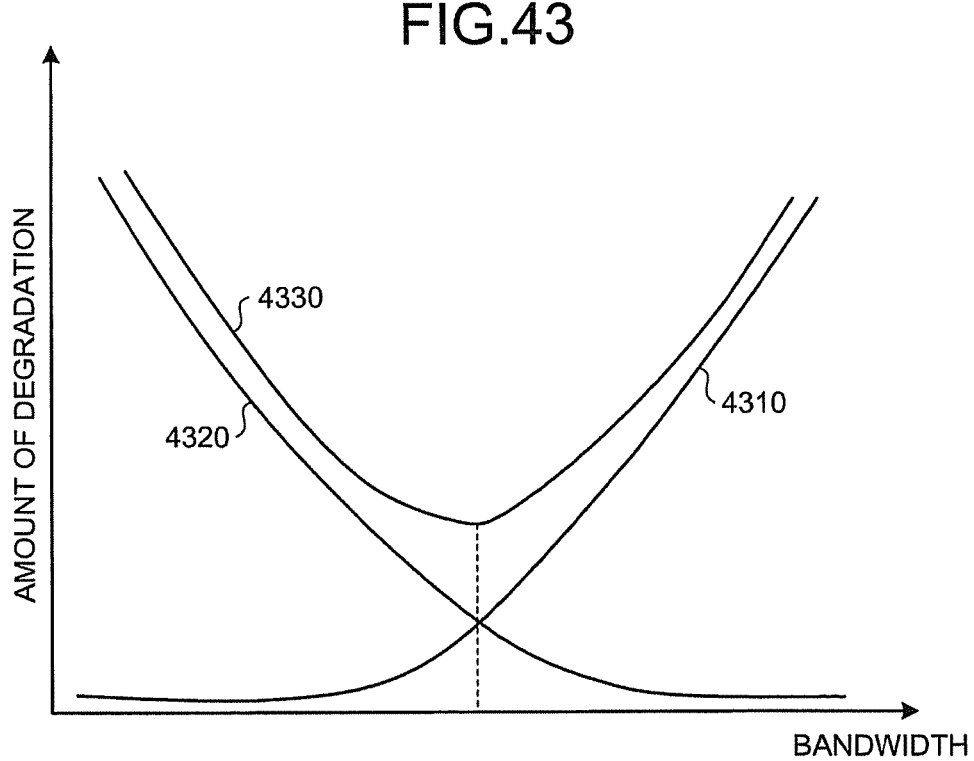
FIG. 43 is a graph of an example of the operation of the optical receiving apparatus depicted in FIG. 40.

FIG. 43 is a graph of an example of the operation of the optical receiving apparatus depicted in FIG. 40. In FIG. 43, the axis of abscissa represents the bandwidth of the tunable filter 4010 and the axis of ordinate represents the amount of degradation of the quality of the optical signal. A property 4310 represents the amount of degradation of the signal quality due to the narrowing of the optical spectrum of the signal. A property 4320 represents the amount of degradation of the signal quality due to the group delay ripple outside the effective band.

A combined property 4330 is a property obtained by combining the properties 4310 and 4320 with each other. As indicated by the properties 4310 and 4320, a trading-off relation is established between the amount of degradation of the quality of the optical signal due to the narrowing of the optical spectrum of the signal and the amount of degradation of the quality of the optical signal due to the group delay ripple outside the effective band.

The optical receiving apparatus 1700 executes the feedback control directly measuring the quality of the optical signal and therefore, the optical receiving apparatus 1700 can control the bandwidth of the tunable filter 4010 such that the amount of degradation of the quality of the optical signal in the combined property 4330 is minimized.

As described, the optical receiving apparatus 1700 according to the sixth embodiment attenuates the bands outside the effective band of the tunable dispersion compensator 110 using the tunable filter 4010. Thereby, degradation of the optical signal due to the group delay ripple outside the effective band of the group delay property can be controlled. Especially, in the tunable dispersion compensator 110 having a transmission band that is sufficiently wide relative to the dispersion band, the quality of the optical signal can be improved significantly by preventing the degradation of the signal due to the group delay ripple.

The optical receiving apparatus 1700 controls the filtering property of the tunable filter 4010 in the control direction for the quality of the optical signal that has been dispersion-compensated by the tunable dispersion compensator 110 to be improved. Thereby, even when the group delay property of the tunable dispersion compensator 110 is not known in advance, degradation of the optical signal due to the group delay ripple outside the effective band of the group delay property can be prevented more effectively using the asymmetry of the group delay property in the bands outside the effective band.

Feedback control that feeds back the quality of the optical signal is established and therefore, the filtering property of the tunable filter 4010 can be controlled precisely to an optimal value therefor. Even when the group delay property of the tunable dispersion compensator 110 varies, the filtering property of the tunable filter 4010 can be set at an optimal value corresponding to the variation of the group delay property of the tunable dispersion compensator 110. The quality of the optical signal is directly measured by receiving the optical signal and therefore, the filtering property of the tunable filter 4010 can be shifted precisely to an optical value.

Although not depicted, similarly to the second embodiment, the power of the optical signal that has been dispersion-compensated by the tunable dispersion compensator 110 may be measured and the filtering property of the tunable filter 4010 may also be controlled in a control direction corresponding to the power measured.

A case has been described above where the group delay property of the tunable dispersion compensator 110 is a group delay property that is asymmetrical in the bands outside the effective band. However, when the control is executed of the bandwidth of the tunable filter 4010 by the band controller 4021, the group delay property of the tunable dispersion compensator 110 may be symmetrical in the bands outside the effective band.

Figure 44:
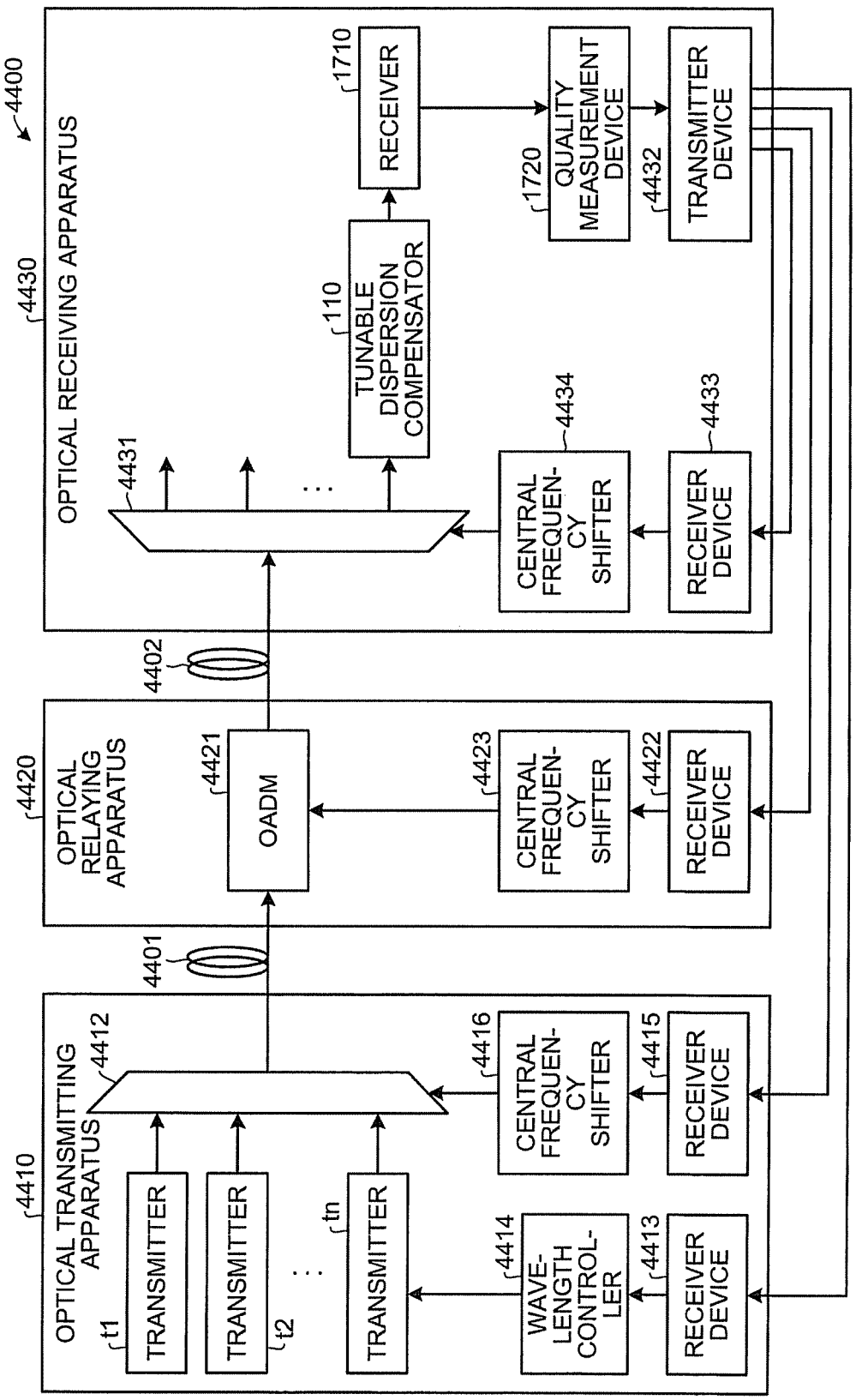
FIG. 44 is a block diagram of a dispersion compensating apparatus according to a seventh embodiment.

FIG. 44 is a block diagram of a dispersion compensating apparatus according to a seventh embodiment. In FIG. 44, components identical to those depicted in FIG. 42 are given the same reference numerals used in FIG. 42 and will not again be described. As depicted in FIG. 44, the communication system 4400 according to the seventh embodiment includes an optical transmitting apparatus 4410, an optical relaying apparatus 4420, and an optical receiving apparatus 4430. The optical transmitting apparatus 4410 is connected to the optical relaying apparatus 4420 through a transmission path 4401. The optical relaying apparatus 4420 is connected to the optical receiving apparatus 4430 through a transmission path 4402.

The optical transmitting apparatus 4410 includes transmitters t1 to tn, a wavelength multiplexer 4412, a receiver device 4413, a wavelength controller 4414, a receiver device 4415, and a central frequency shifter 4416. The transmitters t1 to tn each generate an optical signal that has a different wavelength from each other. The transmitters t1 to tn output the generated optical signals to the wavelength multiplexer 4412. The wavelength of the optical signal of the transmitter tn may be varied according to the control of the wavelength controller 4414.

The wavelength multiplexer 4412 wavelength-multiplexes the optical signals output from the transmitters t1 to tn, and transmits a WDM signal obtained by the wavelength-multiplexing to the optical relaying apparatus 4420 through the transmission path 4401. The wavelength multiplexer 4412 has a predetermined transmission band. The central frequency of the transmission property of the wavelength multiplexer 4412 may be varied according to the control of the central frequency shifter 4416.

The receiver device 4413 receives the quality of the optical signal transmitted from the optical receiving apparatus 4430 and notifies the wavelength controller 4414 of the quality received. The wavelength controller 4414 controls the wavelength of the optical signal of the transmitter tn in a direction for the quality reported by the receiver device 4413 to be improved.

The receiver device 4415 receives the quality of the optical signal transmitted from the optical receiving apparatus 4430 and notifies the central frequency shifter 4416 of the quality received. The central frequency shifter 4416 shifts the central frequency of the transmission property of the wavelength multiplexer 4412 in a direction for the quality reported by the receiver device 4415 to be improved.

The optical relaying apparatus 4420 includes an optical add-drop multiplexer (OADM) 4421, a receiver device 4422, and a central frequency shifter 4423. The OADM 4421 executes adding and dropping with respect to the WDA signal transmitted from the optical receiving apparatus 4410 using a wavelength selectable switch (WSS) included in the OADM 4421. The OADM 4421 transmits the WDM signal for which the OADM 4421 has executed the adding and dropping, to the optical receiving apparatus 4430 through the transmission path 4402. The WSS included in the OADM 4421 has a predetermined transmission band. The central frequency of the transmission property of the WSS may be varied according to the control of the central frequency shifter 4423.

The receiver device 4422 receives the quality of the optical signal transmitted from the optical receiving apparatus 4430 and notifies the central frequency shifter 4423 of the quality received. The central frequency shifter 4423 shifts the central frequency of the transmission property of the WSS included by the OADM 4421 in a direction for the quality reported by the receiver device 4422 to be improved.

The optical receiving apparatus 4430 includes a demultiplexer 4431, the tunable dispersion compensator 110, the receiver 1710, the quality measurement device 1720, a transmitter device 4432, a receiver device 4433, and a central frequency shifter 4434. The demultiplexer 4431 wavelength-de-multiplexes the WDM signal transmitted from the optical relaying apparatus 4420, and transmits optical signals obtained by the wavelength-de-multiplexing. The demultiplexer 4431 has a predetermined transmission band. The central frequency of the transmission property of the demultiplexer 4431 may be varied according to the control of the central frequency shifter 4434.

The tunable dispersion compensator 110 dispersion-compensates one of the optical signals transmitted from the demultiplexer 4431. The tunable dispersion compensator 110 outputs the dispersion-compensated optical signal to the receiver 1710. The receiver 1710 outputs a signal obtained by receiving the optical signal output from the tunable dispersion compensator 110, to the quality measurement device 1720. The quality measurement device 1720 measures the quality of the signal output from the receiver 1710, and notifies the transmitter device 4432 of the quality measured.

The transmitter device 4432 transmits the quality reported by the quality measurement device 1720, to the optical transmitting apparatus 4410, the optical relaying apparatus 4420, and the optical receiver device 4433. The notification of the quality by the transmitter device 4432 is executed using, for example, a NMS network management System or a monitor control signal.

The receiver device 4433 receives the quality of the optical signal transmitted from the transmitter device 4432. The receiver device 4433 notifies the central frequency shifter 4434 of the quality received. The central frequency shifter 4434 shifts the central frequency of the transmission property of the demultiplexer 4431 in a direction for the quality reported by the receiver device 4433 to be improved.

As described, the communication system 4400 according to the seventh embodiment controls the filtering property of the components of the communication system 4400 in the control direction for the quality of the optical signal that is dispersion-compensated by the tunable dispersion compensator 110 to be improved. Filtering property of the components of the communication system 4400 may be the transmission property of the wavelength multiplexer 4412, the central frequency of the transmission property of the WSS included in the OADM 4421, or the central frequency of the transmission property of the demultiplexer 4431.

Thereby, the same effect as that of the optical receiving apparatus 1700 according to the sixth embodiment is obtained. By controlling the wavelength of the optical signal of the transmitter tn, the band occupied by the optical signal can be shifted from the band of the group delay ripple in the tunable dispersion compensator 110. Thereby, the same effect as that of the optical receiving apparatus 1700 according to the sixth embodiment is obtained.

As described, according to the dispersion compensating apparatus, the dispersion compensating method, the optical receiving apparatus, and the optical receiving method, degradation of an optical signal due to a group delay ripple outside an effective band of a group delay property can be controlled. Even when multiple tunable dispersion compensators are not provided, the degradation of the optical signal due to the group delay ripple outside the effective band of the group delay property can be controlled.

Therefore, the degradation of the optical signal can be controlled preventing the problems such as increases in insertion loss, the size of the apparatuses, and the cost. However, the above apparatuses and methods may each be adapted to include multiple tunable dispersion compensators provided therein. Thereby, the degradation of the optical signal due to the group delay ripple can be controlled more effectively.

According to the above configuration, in the optical signal, a component may be attenuated of a band that is influenced by the group delay ripple of the tunable dispersion compensator. A large group delay ripple of the group delay property may be shifted from the band occupied by the optical signal by using the asymmetry of the bands outside the effective band of the group delay property.

According to the embodiments, an effect is achieved in that degradation of an optical signal due to a group delay ripple can be controlled.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A dispersion compensating apparatus comprising:
a tunable dispersion compensator that dispersion-compensates an optical signal using a group delay property having bands outside an effective band that is asymmetrical;
a set device that sets a dispersion compensation amount in the tunable dispersion compensator; and
a shifter that shifts a central frequency of the effective band of the tunable dispersion compensator, based on the dispersion compensation amount set by the set device, to enable the dispersion compensating, and
wherein a constant dispersion compensation amount is provided for the optical signal in the effective band.

2. The dispersion compensating apparatus according to claim 1, further comprising
a storage device that correlates and stores therein a shift amount of the central frequency and the dispersion compensation amount, wherein
the shifter shifts the central frequency using the shift amount that is correlated with the dispersion compensation amount set by the set device.

3. The dispersion compensating apparatus according to claim 1, wherein the shifter shifts the central frequency towards one of the bands and has a large group delay ripple of the group delay property.

4. A dispersion compensating method that uses a tunable dispersion compensator that dispersion-compensates an optical signal using a group delay property having bands outside an effective band that is asymmetrical, the method comprising:

setting, by a processor, a dispersion compensation amount in the tunable dispersion compensator; and shifting a central frequency of the effective band of the tunable dispersion compensator, based on the dispersion compensation amount set at the setting, to enable the dispersion compensating, and wherein a constant dispersion compensation amount is provided for the optical signal in the effective band.

5. A dispersion compensating apparatus comprising:

a tunable dispersion compensator that dispersion-compensates an optical signal using a group delay property having bands outside an effective band that is asymmetrical;

a measurement device that measures power of a specific frequency component obtained after photoelectric conversion of the optical signal that has been dispersion-compensated by the tunable dispersion compensator; and a shifter that shifts a central frequency of the effective band of the tunable dispersion compensator in a shift direction that corresponds to the power measured by the measurement device, to enable the dispersion compensating, and wherein a constant dispersion compensation amount is provided for the optical signal in the effective band.

6. The dispersion compensating apparatus according to claim 5, wherein the measurement device measures power of a frequency component of the optical signal, and the shifter shifts the central frequency in a shift direction for the power measured by the measurement device to be increased.

7. The dispersion compensating apparatus according to claim 5, wherein the measurement device measures power of a frequency component that differs from a baud rate of the optical signal, and the shifter shifts the central frequency in a shift direction for the power measured by the measurement device to be decreased.

8. A dispersion compensating method that uses a tunable dispersion compensator that dispersion-compensates an optical signal using a group delay property having bands outside an effective band that is asymmetrical, the method comprising:

measuring, by a processor, power of a specific frequency component obtained after photoelectric conversion of the optical signal that has been dispersion-compensated by the tunable dispersion compensator; and shifting a central frequency of the effective band of the tunable dispersion compensator in a shift direction that corresponds to the power measured at the measuring, to enable the dispersion compensating, and wherein a constant dispersion compensation amount is provided for the optical signal in the effective band.

9. An optical receiving apparatus comprising:

a tunable dispersion compensator that dispersion-compensates an optical signal using a group delay property having bands outside an effective band that is asymmetrical;

a receiver device that receives the optical signal that has been dispersion-compensated by the tunable dispersion compensator;

a measurement device that measures quality of the optical signal that is received by the receiver device; and a shifter that shifts a central frequency of the effective band of the tunable dispersion compensator in a shift direction for the quality measured by the measurement device to be improved to enable dispersion compensation, and wherein a constant dispersion compensation amount is provided for the optical signal in the effective band.

10. An optical receiving method that uses a tunable dispersion compensator that dispersion-compensates an optical signal using a group delay property having bands outside an effective band that is asymmetrical, the method comprising:

receiving the optical signal that has been dispersion-compensated by the tunable dispersion compensator;

measuring, by a processor, quality of the optical signal that is received at the receiving; and shifting a central frequency of the effective band of the tunable dispersion compensator in a shift direction for the quality measured at the measuring to be improved to enable dispersion compensation, and wherein a constant dispersion compensation amount is provided for the optical signal in the effective band.

11. A dispersion compensating apparatus comprising:

a tunable dispersion compensator that has transmission band sufficiently wide relative to an effective band of a group delay property and bands outside the effective band and dispersion-compensates an optical signal using the group delay property; and a filter that attenuates the bands outside the effective band of the optical signal and affected by the group delay ripple.

12. A dispersion compensating apparatus comprising:

a tunable dispersion compensator that dispersion-compensates an optical signal using a group delay property having bands outside an effective band that is asymmetrical;

a tunable filter that attenuates the bands outside the effective band of the optical signal and has a filtering property that is variable and includes at least one among a central frequency of a transmission property and a bandwidth;

a set device that sets a dispersion compensation amount in the tunable dispersion compensator; and a controller that controls the filtering property of the tunable filter, based on the dispersion compensation amount set by the set device, to enable the dispersion compensating.

13. The dispersion compensating apparatus according to claim 12, further comprising a storage device that correlates and stores therein, the dispersion compensation amount and a control amount of the filtering property, wherein the controller controls the filtering property using the control amount correlated with the dispersion compensation amount set by the set device.

14. A dispersion compensating method, the method comprising:

providing a tunable dispersion compensator that dispersion-compensates an optical signal using a group delay property having bands outside an effective band that is asymmetrical;

attenuating, via a tunable filter, the bands outside the effective band of the optical signal and has a filtering property that is variable and includes at least one among a central frequency of a transmission property and a bandwidth;

setting a dispersion compensation amount in the tunable dispersion compensator; and controlling the filtering property of the tunable filter, based on the dispersion compensation amount set at the setting, to enable the dispersion compensating.

15. An optical receiving apparatus comprising:

a tunable dispersion compensator that dispersion-compensates an optical signal using a group delay property having bands outside an effective band that is asymmetrical;

a tunable filter that attenuates the bands outside the effective band of the optical signal and has a filtering property that is variable and includes at least one among a central frequency of a transmission property and a bandwidth;

a receiver that receives the optical signal that has been dispersion-compensated by the tunable dispersion compensator;

a measurement device that measures quality of the optical signal received by the receiver; and a controller that controls the filtering property of the tunable filter in a control direction for the quality measured by the measurement device to be improved to enable dispersion compensation.

16. An optical receiving method, the method comprising:

providing a tunable dispersion compensator that dispersion-compensates an optical signal using a group delay property having bands outside an effective band that is asymmetrical;

attenuating, via a tunable filter, the bands outside the effective band of the optical signal and has a filtering property that is variable and includes at least one among a central frequency of a transmission property and a bandwidth;

receiving the optical signal that has been dispersion-compensated by the tunable dispersion compensator;

measuring quality of the optical signal received at the receiving; and controlling the filtering property of the tunable filter in a control direction for the quality measured at the measuring to be improved to enable dispersion compensation.

* * * * *